United States Patent
Georgiev et al.

(10) Patent No.: US 8,400,555 B1
(45) Date of Patent: Mar. 19, 2013

(54) FOCUSED PLENOPTIC CAMERA EMPLOYING MICROLENSES WITH DIFFERENT FOCAL LENGTHS

(75) Inventors: Todor G. Georgiev, Sunnyvale, CA (US); Andrew Lumsdaine, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 566 days.

(21) Appl. No.: 12/628,437

(22) Filed: Dec. 1, 2009

(51) Int. Cl.
*G03B 13/00* (2006.01)
*H04N 5/232* (2006.01)

(52) U.S. Cl. ............................ 348/345; 348/222.1

(58) Field of Classification Search ............... 348/222.1, 348/335, 340, 345
See application file for complete search history.

(56) References Cited

U.S. PATENT DOCUMENTS

| | | | |
|---|---|---|---|
| 3,985,419 A | 10/1976 | Matsumoto et al. | |
| 4,193,093 A | 3/1980 | St. Clair | |
| 4,230,942 A | 10/1980 | Stauffer | |
| 4,580,219 A | 4/1986 | Pelc et al. | |
| 4,849,782 A | 7/1989 | Koyama et al. | |
| 5,076,687 A | 12/1991 | Adelson | |
| 5,361,127 A | 11/1994 | Daily | |
| 5,400,093 A | 3/1995 | Timmers | |
| 5,729,011 A | 3/1998 | Sekiguchi | |
| 6,097,394 A | 8/2000 | Levoy et al. | |
| 6,137,535 A | 10/2000 | Meyers | |
| 6,339,506 B1 | 1/2002 | Wakelin et al. | |
| 6,351,269 B1 | 2/2002 | Georgiev | |
| 7,019,671 B2 | 3/2006 | Kawai | |
| 7,085,062 B2 | 8/2006 | Hauschild | |
| 7,620,309 B2 | 11/2009 | Georgiev | |
| 7,792,423 B2 | 9/2010 | Raskar et al. | |
| 7,880,794 B2 | 2/2011 | Yamagata et al. | |
| 7,962,033 B2 | 6/2011 | Georgiev et al. | |
| 8,019,215 B2 | 9/2011 | Georgiev et al. | |
| 2001/0012149 A1 | 8/2001 | Lin et al. | |
| 2001/0050813 A1 | 12/2001 | Allio | |

(Continued)

FOREIGN PATENT DOCUMENTS

| | | |
|---|---|---|
| JP | 7270791 | 10/1995 |
| JP | 2001330769 | 11/2001 |

(Continued)

OTHER PUBLICATIONS

JP504669 (1975), all pages, english equivalent is U.S. Patent 3985419, dated Oct. 12, 1976 by Matsumoto, et al.

(Continued)

*Primary Examiner* — Gevell Selby
(74) *Attorney, Agent, or Firm* — Wolfe-SBMC

(57) ABSTRACT

Methods and apparatus for capturing and rendering images with focused plenoptic cameras employing microlenses with different focal lengths. A focused plenoptic camera that includes an array of microlenses with at least two different focal lengths may be used to simultaneously capture microimages from at least two different planes at different distances from the microlens array. Image operations such as refocusing and focus bracketing may be performed on flats captured with the camera. Images may be constructed from subsets of the microimages captured using each type of microlens, thus creating multiple images each focused at a different depth. An array of stacked microlenses including stacks that provide different focal lengths may be used. The lens stacks may be provided by stacking two microlenses arrays on top of each other in the camera.

19 Claims, 31 Drawing Sheets

U.S. PATENT DOCUMENTS

| | | | |
|---|---|---|---|
| 2003/0231255 | A1 | 12/2003 | Szajewski et al. |
| 2005/0088714 | A1 | 4/2005 | Kremen |
| 2006/0104542 | A1 | 5/2006 | Blake et al. |
| 2007/0091197 | A1 | 4/2007 | Okayama et al. |
| 2007/0252074 | A1 | 11/2007 | Ng et al. |
| 2008/0007839 | A1* | 1/2008 | Deng et al. ............... 359/642 |
| 2008/0056549 | A1 | 3/2008 | Hamill et al. |
| 2008/0107231 | A1 | 5/2008 | Miyazaki et al. |
| 2008/0142685 | A1* | 6/2008 | Gazeley ............... 250/208.1 |
| 2008/0165270 | A1 | 7/2008 | Watanabe et al. |
| 2008/0166063 | A1 | 7/2008 | Zeng |
| 2008/0187305 | A1 | 8/2008 | Raskar et al. |
| 2008/0218610 | A1 | 9/2008 | Chapman et al. |
| 2008/0247623 | A1 | 10/2008 | Delso et al. |
| 2009/0027542 | A1* | 1/2009 | Yamamoto et al. ........... 348/340 |
| 2009/0086304 | A1 | 4/2009 | Yurlov et al. |
| 2009/0127440 | A1* | 5/2009 | Nakai ................. 250/227.2 |
| 2009/0128658 | A1* | 5/2009 | Hayasaka et al. ......... 348/222.1 |
| 2009/0140131 | A1 | 6/2009 | Utagawa |
| 2009/0295829 | A1 | 12/2009 | Georgiev et al. |
| 2010/0205388 | A1 | 8/2010 | MacInnis |
| 2010/0265386 | A1 | 10/2010 | Raskar et al. |

FOREIGN PATENT DOCUMENTS

| | | |
|---|---|---|
| JP | 2004239932 | 8/2004 |
| WO | 2006/057838 | 6/2006 |

OTHER PUBLICATIONS

Adelson, T., et al., "Single Lens Sterio witha Plenoptic Camera," IEEE Transactions on Pattern Analysis and machine Intelligence 14, 2, Feb. 1992, pp. 99-106.

Ng, R., et al., "Light Field Photography with a Hand-Held Plenoptic Camera," Stanford Univ. Computer Science Tech Report CSTR Feb. 2005, Apr. 2005.

U.S. Appl. No. 12/271,389, filed Nov. 14, 2008.

Adelson, T., and Wang, J., "Single lens stereo with a plenoptic camera," IEEE Transactions on Pattern Analysis and Machine Intelligence 14, issue 2, 99-106, 1992.

Borman, S., and Stevenson, R., "Super-resolution from image sequences—a review", Proceedings of the 1998 Midwest Symposium on Circuits and Systems, Publication Date: Aug. 9-12, 1998, on pp. 374-378.

Elad, M., and Feuer, A., "Restoration of a single superresolution image from several blurred, noisy, and undersampled measured images," IEEE Transactions on Image Processing Dec. 1997.

Farsiu, S., Robinson, D., Elad, M., and Milanfar, P., "Advances and challenges in super-resolution," International Journal of Imaging Systems and Technology, 2004.

Georgiev, T., Zheng, K., Curless, B., Salesin, D., and et al., "Spatio-angular resolution tradeoff in integral photography," Proc. Eurographics Symposium on Rendering, 2006.

Gortler, S. J., Grzeszczuk, R., Szeliski, R., and Cohen, M. F., "The lumigraph," ACM Trans. Graph., 43-54, 1996.

Isaksen, A., McMillan, L., and Gortler, S. J., "Dynamically reparameterized light fields," ACM Trans. Graph., 297-306, 2000.

Levoy, M., and Hanrahan, P., Light field rendering, ACM Trans. Graph., 31-42, 1996.

Ng, R., Levoy, M., Brdif, M., Duval, G., Horowitz, M., and Hanrahan, P., "Light field photography with a hand-held plenoptic camera," 2005.

Ng, R., "Fourier slice photography," International Conference on Computer Graphics and Interactive Techniques Proceedings of ACM SIGGRAPH 2005.

Park, S., Park, M., and Kang, M., "Super-resolution image reconstruction: a technical overview," Signal Processing Magazine, 2003.

Veeraraghavan, A., Mohan, A., Agrawal, A., Raskar, R., and Tumblin, J., "Dappled photography: Mask enhanced cameras for heterodyned light fields and coded aperture refocusing," ACM Trans. Graph. 26, 3, 69, 2007.

U.S. Appl. No. 12/503,803, filed Jul. 15, 2009.

Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, 203.

Georgiev, et al. "Light-Field Capture by Multiplexing in the Frequency Domain," ADOBE Technical Report, Apr. 2007, all pages.

\* cited by examiner

*(Keplerian telescopic case)*

*(Galilean telescopic case)*

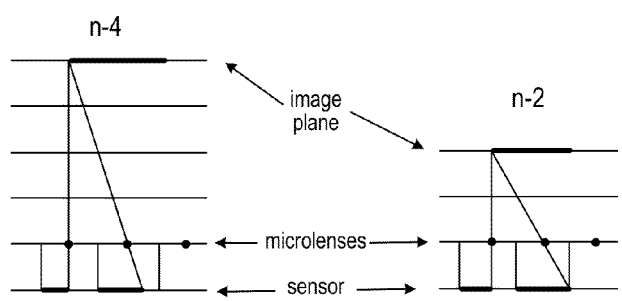
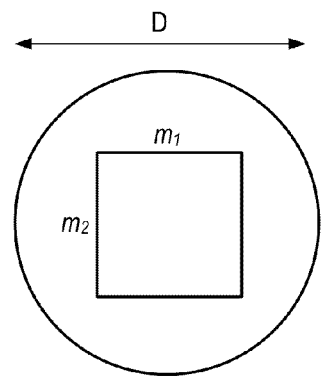
FIG. 14A    FIG. 14B    FIG. 15
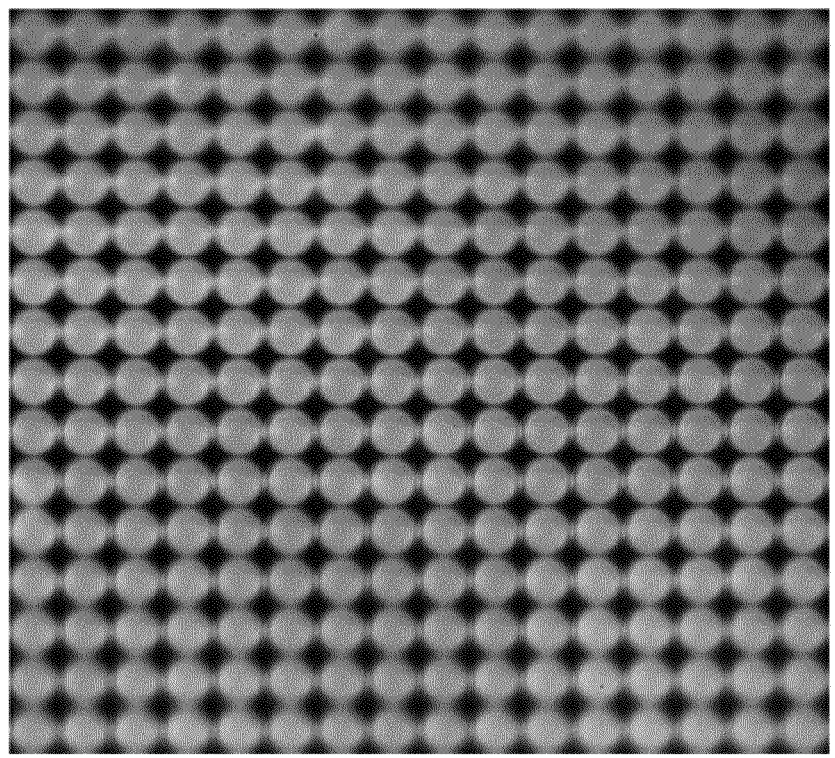
FIG. 16

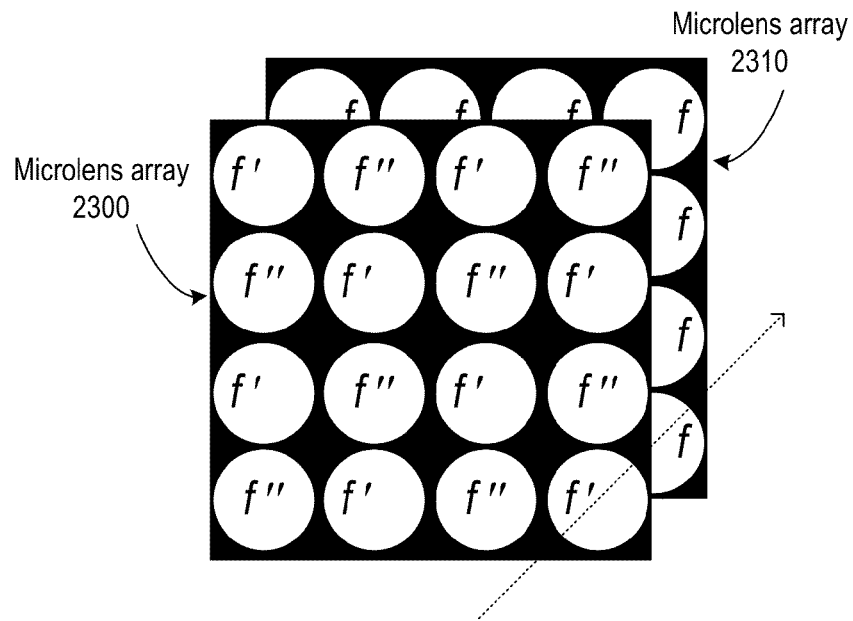
FIG. 33
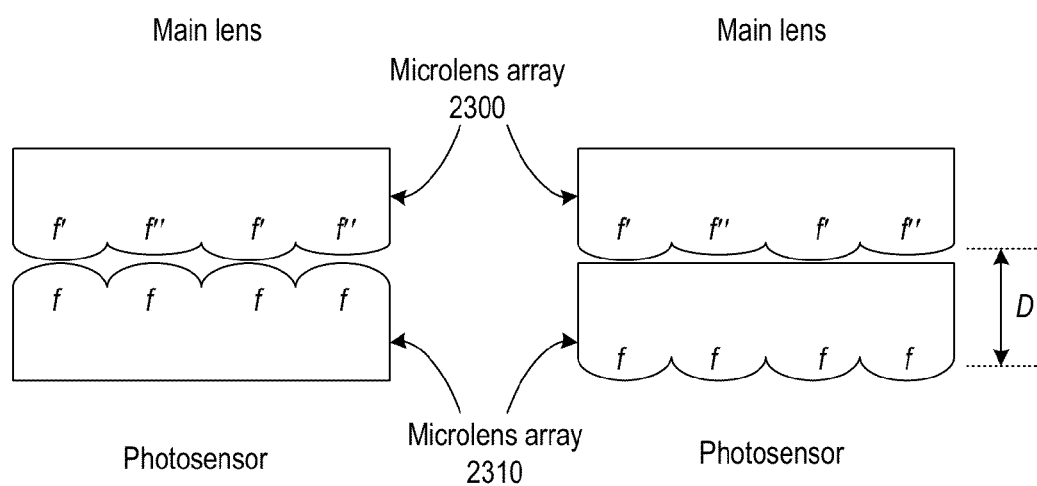
FIG. 34A                                    FIG. 34B

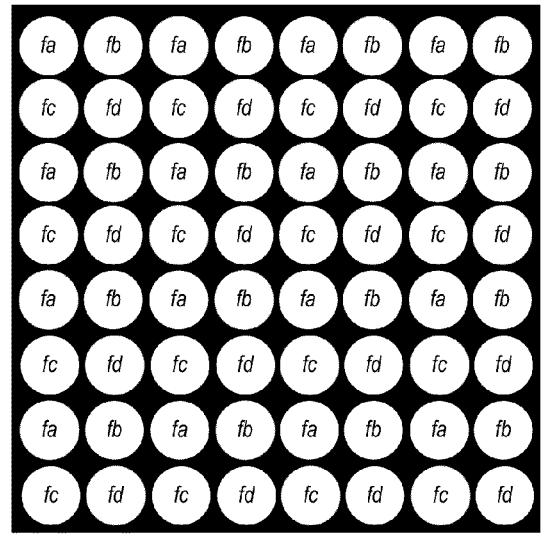
FIG. 39
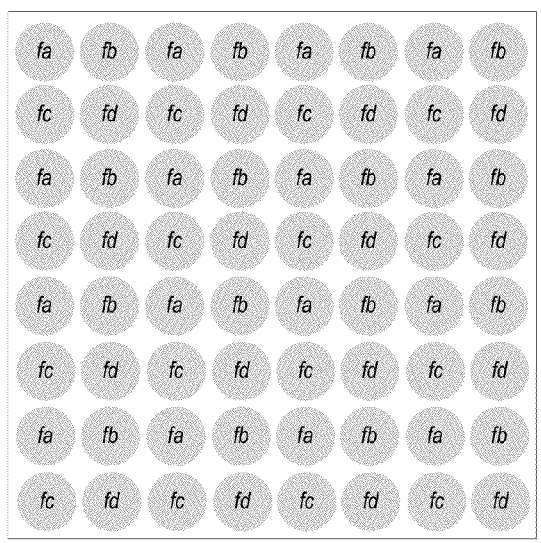
FIG. 40
FIG. 41

FOCUSED PLENOPTIC CAMERA EMPLOYING MICROLENSES WITH DIFFERENT FOCAL LENGTHS

BACKGROUND

Description of the Related Art

In a conventional camera, the main lens maps the 3D world of the scene outside camera into a 3D world inside camera. FIG. 1 illustrates imaging in a conventional camera. "Inside world" represents inside the camera. The shaded oval regions represent the order of depths in the outside world, and the corresponding depths inside the camera. One particular image plane inside the camera is shown. The mapping of the 3D world of the scene outside camera into a 3D world inside camera is governed by the lens equation:

$$\frac{1}{A} + \frac{1}{B} = \frac{1}{F}$$

where A and B are respectively the distances from the lens to the object plane and from the lens to the image plane. This equation is normally used to describe the effect of a single image mapping between two fixed planes. In reality, however, the lens equation describes an infinite number of mappings—it constrains the relationship between, but does not fix, the values of the distances A and B. That is, every plane in the outside scene (which is described as being at some distance A from the objective lens) is mapped by the objective lens to a corresponding plane inside of the camera at a distance B. When a sensor (e.g., conventional film, a charge-coupled device (CCD), etc.) is placed at a distance B between F and ∞ (infinity) inside the camera, the sensor captures an in-focus image of the corresponding plane at A that was mapped from the scene in front of the lens.

Conventional cameras render a three-dimensional scene onto a two-dimensional sensor. During operation, a conventional digital camera captures a two-dimensional (2-D) image representing a total amount of light that strikes each point on a photosensor within the camera. However, this 2-D image contains no information about the direction of the light that strikes the photosensor. The image captured by a conventional camera essentially integrates the radiance function over its angular portion, resulting in a two-dimensional intensity as a function of position. The angular information of the original radiance is lost. Thus, conventional cameras fail to capture a large amount of optical information.

Light-Field or Radiance Capturing Cameras

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

Light-fields, i.e. radiance, may be captured with a conventional camera. In one conventional method, M×N images of a scene may be captured from different positions with a conventional camera. If, for example, 8×8 images are captured from 64 different positions, 64 images are produced. The pixel from each position (i, j) in each image are taken and placed into blocks, to generate 64 blocks. FIG. 2 illustrates an example prior art light-field camera, or camera array, which employs an array of two or more objective lenses 110. Each objective lens focuses on a particular region of photosensor 108, or alternatively on a separate photosensor 108. This light-field camera 100 may be viewed as a combination of two or more conventional cameras that each simultaneously records an image of a subject on a particular region of photosensor 108 or alternatively on a particular photosensor 108. The captured images may then be combined to form one image.

FIG. 3 illustrates an example prior art plenoptic camera, another type of radiance capturing camera, that employs a single objective lens and a microlens or lenslet array 106 that includes, for example, about 100,000 lenslets. In a conventional plenoptic camera 102, lenslet array 106 is fixed at a small distance (~0.5 mm) from a photosensor 108, e.g. a charge-coupled device (CCD). In conventional plenoptic cameras, the microlenses are placed and adjusted accurately to be exactly at one focal length f from the sensor 108. This is done by placing the array of microlenses at distance f from the sensor, where f is the focal length of the microlenses. Another way to say this is that, for the microlenses, f is chosen to be equal to the distance to the photosensor 108. In other words, the microlenses are focused on infinity, which is essentially equivalent to focusing the microlenses on the main lens 104, given the large distance of the microlenses to the main lens relative to the focal length of the microlenses. Thus, the raw image captured with plenoptic camera 102 is made up of an array of small images, typically circular, of the main lens 108. These small images may be referred to as microimages. However, in conventional plenoptic camera 102, each microlens does not create an image of the internal world on the sensor 108, but instead creates an image of the main camera lens 104.

The lenslet array 106 enables the plenoptic camera 102 to capture the light-field, i.e. to record not only image intensity, but also the distribution of intensity in different directions at each point. Each lenslet splits a beam coming to it from the main lens 104 into rays coming from different locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 102 generates a microimage at each macropixel. The plenoptic photograph captured by a camera 102 with, for example, 100,000 lenslets will contain 100,000 macropixels, and thus generate 100,000 microimages of a subject. Each macropixel contains different angular samples of the light rays coming to a given microlens. Each macropixel contributes to only one pixel in the different angular views of the scene; that is, only one pixel from a macropixel is used in a given angular view. As a result, each angular view contains 100,000 pixels, each pixel contributed from a different macropixel. Another type of integral or light-field camera is similar to the plenoptic camera of FIG. 3, except that an array of pinholes is used between the main lens and the photosensor instead of an array of lenslets.

FIG. 4 further illustrates an example prior art plenoptic camera model. In conventional plenoptic camera 102, the microlens-space system swaps positional and angular coordinates of the radiance at the microlens. For clarity, only the rays through one of the microlenses are illustrated. The conventional optical analysis of such a plenoptic camera considers it as a cascade of a main lens system followed by a microlens system. The basic operation of the cascade system is as follows. Rays focused by the main lens 104 are separated by the microlenses 106 and captured on the sensor 108. At their point of intersection, the rays have the same position but different slopes. This difference in slopes causes the separation of the rays when they pass through a microlens-space system. In more detail, each microlens functions to swap the positional and angular coordinates of the radiance, then this new positional information is captured by the sensor 108. Because of the swap, it represents the angular information at the microlens. As a result, each microlens image captured by sensor 108 represents the angular information for the radiance at the position of the optical axis of the corresponding microlens.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image sensor technology, on the other hand, is only two-dimensional, and light-field imagery must therefore be captured and represented in flat (two dimensional) form. A variety of techniques have been developed to transform and capture the 4D radiance in a manner compatible with 2D sensor technology. This may be referred to as a flat representation of the 4D radiance (or light-field), or simply as a flat.

Focus Bracketing

There is a fundamental result in optics that no lens is possible that is in focus at all depths at the same time. It is thus not possible to capture a perfectly in-focus 2D image of the 3D world. Each captured image is focused at a certain depth. The best that can be done using conventional image capture techniques is referred to as focus bracketing, which involves taking multiple images without moving the camera while focusing at different depths. The images may then be appropriately combined to generate an image that is in-focus at different depths (e.g., foreground and background). Focus bracketing is thus a conventional technique for increasing depth of field. Some conventional cameras have an automatic setting to capture three or more images while changing the focus in a rapid sequence, thus achieving automatic focus bracketing. However, focus bracketing and other similar conventional techniques cannot compensate for the fact that the images are consecutive in time, and if the field of view being captured is changing, the images do not represent the same scene.

Conventional plenoptic cameras may provide the ability to focus and refocus images from a single flat after the flat is captured. However, conventional plenoptic cameras require extremely high pixel count for the captured image in order to create quality refocused images.

SUMMARY

Various embodiments of methods and apparatus for capturing and rendering images with focused plenoptic cameras employing microlenses with different focal lengths are described. Embodiments may leverage the characteristics of a focused plenoptic camera as described herein to produce quality output images that are in-focus at different depths. Considering the fact that the focused plenoptic camera simultaneously captures multiple, almost identical, microimages, embodiments of a focused plenoptic camera that include microlenses with at least two different focal lengths may be used to simultaneously capture microimages from at least two different planes at different distances from the microlens array. For example, in some embodiments, a focused plenoptic camera that includes microlenses with two different focal lengths may capture some of the microimages from one plane at a distance a from the microlens array, and capture others of the microimages from another plane at a different distance a' from the microlens array. A focused plenoptic camera that includes microlenses with n different focal lengths may be considered as essentially the equivalent of n focused plenoptic cameras in one. Each of these n "cameras" has some amount of 3D capability, but each "camera" is focused at a different depth. Image operations such as refocusing and focus bracketing are thus made possible from such "multiple camera" data. Since all of the microimages in a flat are captured by the focused plenoptic camera at the same time, there is no problem with dynamic scenes in the field of view as there is when using conventional cameras to perform focus bracketing by capturing a sequence of temporally different images.

From a flat captured with a focused plenoptic camera including microlenses of n different focal lengths, images may be constructed from subsets of the microimages captured using each type of microlens, thus creating n images each focused at a different depth. One or more image processing techniques may be applied to two or more of these n images to produce a combined image that incorporates in-focus regions of the two or more images. An advantage of this approach when compared to a focused plenoptic camera with microlenses all of the same focal length and with infinite depth of field in each microlens is that larger apertures may be used, and thus a lower F-number may be used. This results in a faster camera (capturing more of the light), which generally results in better quality images. In addition, focusing is performed optically and not digitally, thus requiring less data to be saved and less data processing to be performed.

Various embodiments of a focused plenoptic camera that employ different optical elements to provide the n different focal lengths are described. Embodiments are described in which an array of single microlenses including at least two different microlenses with different focal lengths are employed; in these embodiments, each single lens may be considered an optical element. Embodiments are also described in which an array of stacks of two (or potentially more) microlenses including at least two different stacks that provide different focal lengths are employed; in these embodiments, each stack of two (or more) microlenses may be considered an optical element. In some embodiments that employ stacks of lenses, the lens stacks may be provided by stacking two microlenses arrays on top of each other in the camera. In some embodiments that use two microlenses arrays, one of the two microlens arrays includes microlenses all of the same focal length, while the other microlens array includes at least two different microlenses of different focal lengths. In this second array, the different microlenses may also provide different depths of field.

BRIEF DESCRIPTION OF THE DRAWINGS

FIG. 14A shows the ray geometry in the Keplerian telescopic case for n=4.

FIG. 14B shows the ray geometry in the Keplerian telescopic case for n=2.

FIG. 15 illustrates a lens circle (or microimage) of diameter D and a patch or crop of size $m_1 \times m_2$, where at least one of $m_1$ and $m_2$ is an integer greater than or equal to 2.

FIG. 16 shows a zoom into an example microlens array.

FIG. 33 illustrates portions of two example microlens arrays that may be combined to form an array of microlens stacks, according to some embodiments.

FIG. 34A shows two example microlens arrays with the microlenses facing each other, according to some embodiments.

FIG. 34B illustrates an arrangement in which the microlenses in the microlens array with microlenses of different focal lengths are facing the flat side of the microlens array including microlenses all of the same focal length, according to some embodiments.

FIG. 39 shows an example microlens array that may be used as a second microlens array in a stack of microlens arrays and that includes four different microlenses with different focal lengths arranged in a checkerboard pattern, according to some embodiments.

FIG. 40 graphically illustrates a portion of a flat including circular microimages that may be captured using a microlens array similar to the example microlens array shown in FIG. 39.

FIG. 41 graphically illustrates a portion of a flat including rectangular microimages that may be captured using a microlens array similar to the example microlens array shown in FIG. 39.

Figure 1:
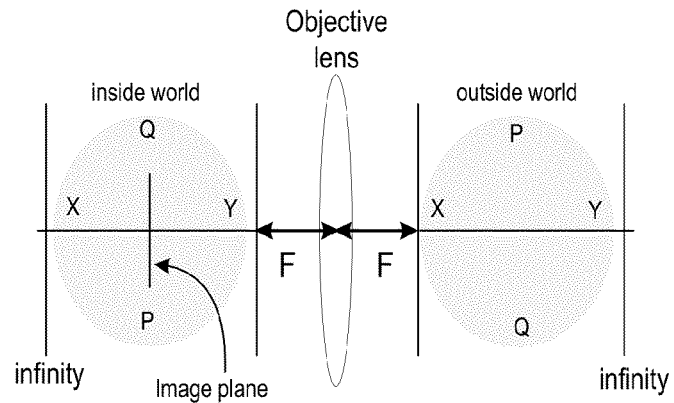
FIG. 1 illustrates imaging in a conventional camera.
Figure 2:
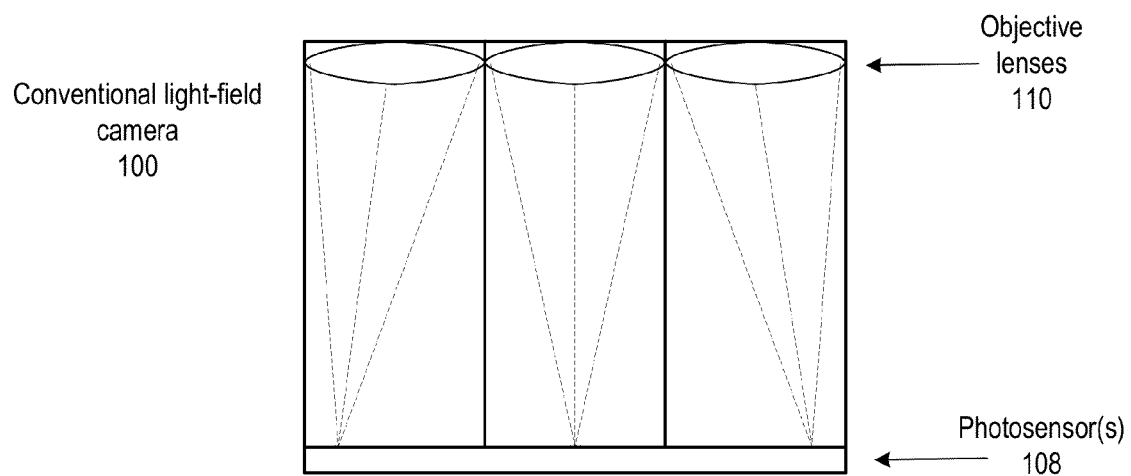
FIG. 2 illustrates an example prior art light-field camera, or camera array, which employs an array of two or more objective lenses.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for full-resolution light-field capture and rendering are described. Embodiments of a full-resolution radiance camera, which may also be referred to as a radiance camera or a focused plenoptic camera, and of a method for rendering high-resolution images from flat 2D representations of the 4D light-field, referred to herein as flats, captured by embodiments of the focused plenoptic camera, are described. The method for rendering high-resolution images from flats captured by embodiments of the focused plenoptic camera may be referred to as a full-resolution light-field rendering method, or simply as the light-field rendering method. The term "full resolution" does not directly refer to sensor resolution of the camera, but instead refers to resolution as supported by the captured radiance data.

Light-field photography enables many new possibilities for digital imaging because it captures both spatial and angular information, i.e., the full four-dimensional radiance, of a scene. High-resolution is required in order to capture four-dimensional data with a two-dimensional sensor. However, images rendered from this data as projections of the four-dimensional radiance onto two spatial dimensions using conventional light-field cameras and conventional light-field rendering methods are at significantly lower resolutions. Embodiments of the focused plenoptic camera and of the full-resolution light-field rendering method more adequately meet the resolution and image size expectations of modern photography than do conventional light-field cameras and rendering methods.

In embodiments of the focused plenoptic camera, the microlenses in the microlens array are focused on the image plane of the main camera lens, rather than on the main camera lens itself as in conventional plenoptic cameras. In the image plane, there is a real image of a scene in front of the camera and refracted by the main lens to the image plane, but there is nothing there physically (other than light); the image plane is simply a plane location in space that can be considered to have an image "in the air" as created by the main lens. The microlenses, being focused on the image plane instead of on the main lens, can capture the image of the scene at the image plane. Each microlens captures a small area or region of the image at the image plane and maps or projects the captured region onto a corresponding region of the photosensor. The imaging property of the focused plenoptic camera may be viewed as two steps: from the world through the main lens to the image plane, and then from the image plane through the microlenses to the photosensor. This is similar to a cascade of two cameras, but the second camera is actually many small cameras, as each microlens is effectively a little camera that captures a small image from the image plane. This is also similar to the way a telescope operates. By focusing the microlenses on the image produced by the main lens, embodiments of the focused plenoptic camera are able to fully capture the positional information of the radiance. Embodiments of the full-resolution light-field rendering method may be used to render full-resolution images from flats captured by embodiments of the focused plenoptic camera, producing output images at a dramatically higher resolution than conventional light-field rendering techniques. Embodiments may render images at spatial resolutions that meet the expectations of modern photography (e.g., 10 megapixel and beyond), making light-field photography much more practical.

An analysis of light-field camera structure and optics is given below that provides insight on the interactions between the main lens system and the microlens array in light-field cameras. Based on results of this analysis, embodiments exploit the fact that, at every plane of depth, the radiance contains a considerable amount of positional information about the scene, encoded in the angular information at that plane. Accordingly, embodiments may be referred to as full-resolution because embodiments make full use of both angular and positional information that is available in the four-dimensional radiance, as shown in the analysis. In contrast to super-resolution techniques, which create high-resolution images from sub-pixel shifted low-resolution images, embodiments render high-resolution images directly from the radiance data. Moreover, embodiments may generate light-field images that are amenable to radiance processing techniques such as Fourier slice refocusing.

Figure 5A:
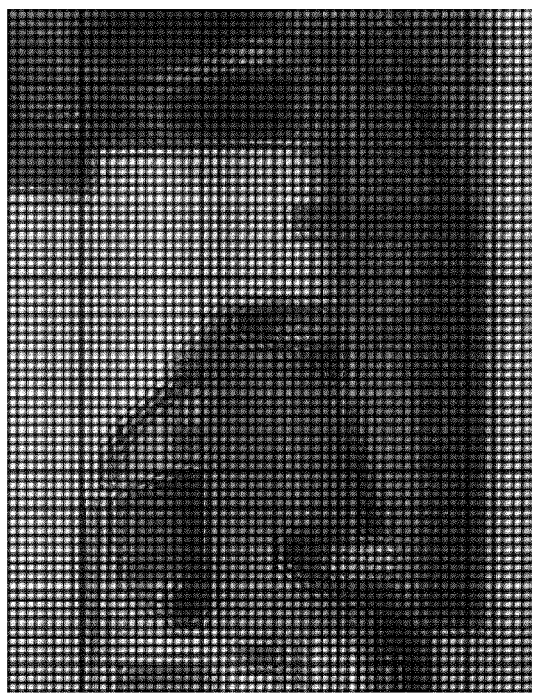
FIG. 5A shows a raw light-field image, or flat, as captured by a plenoptic camera.
Figure 5C:
FIG. 5C shows a final image rendered from the flat of FIG. 5A according to an embodiment of the full-resolution light-field rendering method.
Figure 5B:
FIG. 5B shows a final image rendered from the flat of FIG. 5A according to a conventional rendering method.

FIGS. 5A through 5C show, for comparison, results from a conventional plenoptic camera and rendering method and results from example embodiments of a focused plenoptic camera and full-resolution light-field rendering method as described herein. FIG. 5A shows a raw light-field image as captured by a plenoptic camera. Note that, to the untrained human eye, the raw light-field image captured by a conventional plenoptic camera may look similar to the raw light-field image captured by an embodiment of the focused plenoptic camera. FIG. 5B shows a conventionally rendered final image, and FIG. 5C shows a final image rendered according to an embodiment of the full-resolution light-field rendering method as described herein. Even in this small, grayscale format, a drastic improvement in spatial resolution in FIG. 5C when compared to the spatial resolution in FIG. 5B is easily observable.

Focused Plenoptic Cameras

Figure 3:
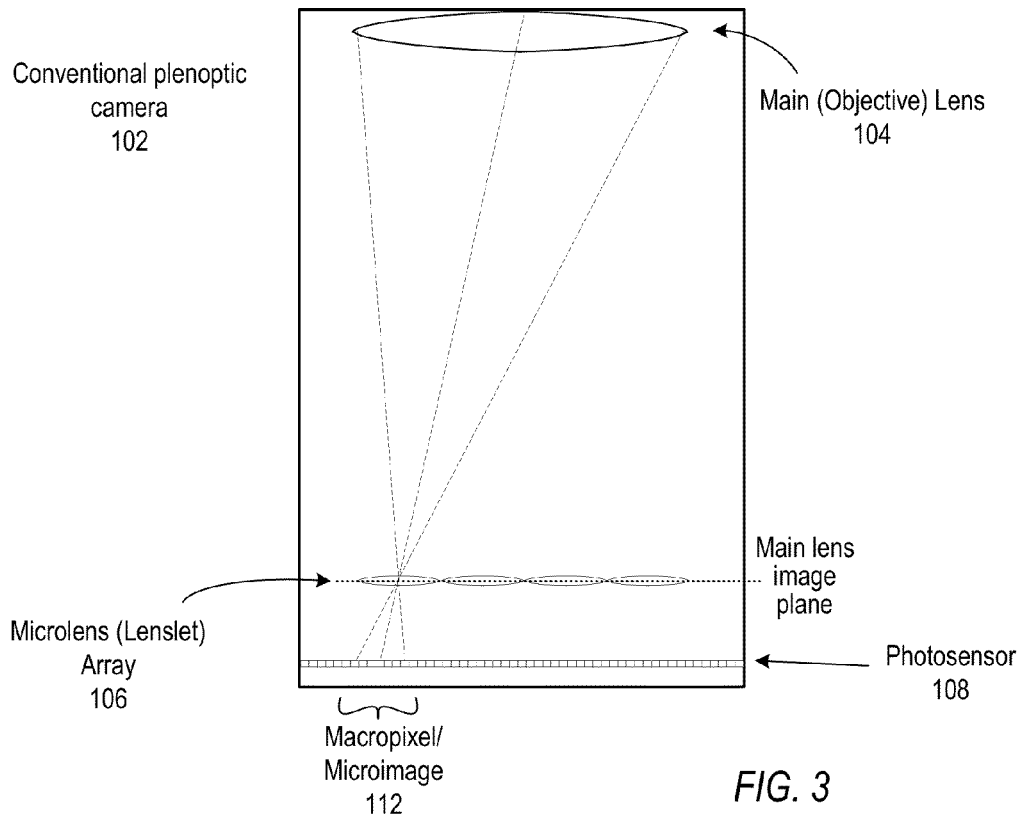
FIG. 3 illustrates an example prior art plenoptic camera that employs a single objective lens and a microlens array.
Figure 4:
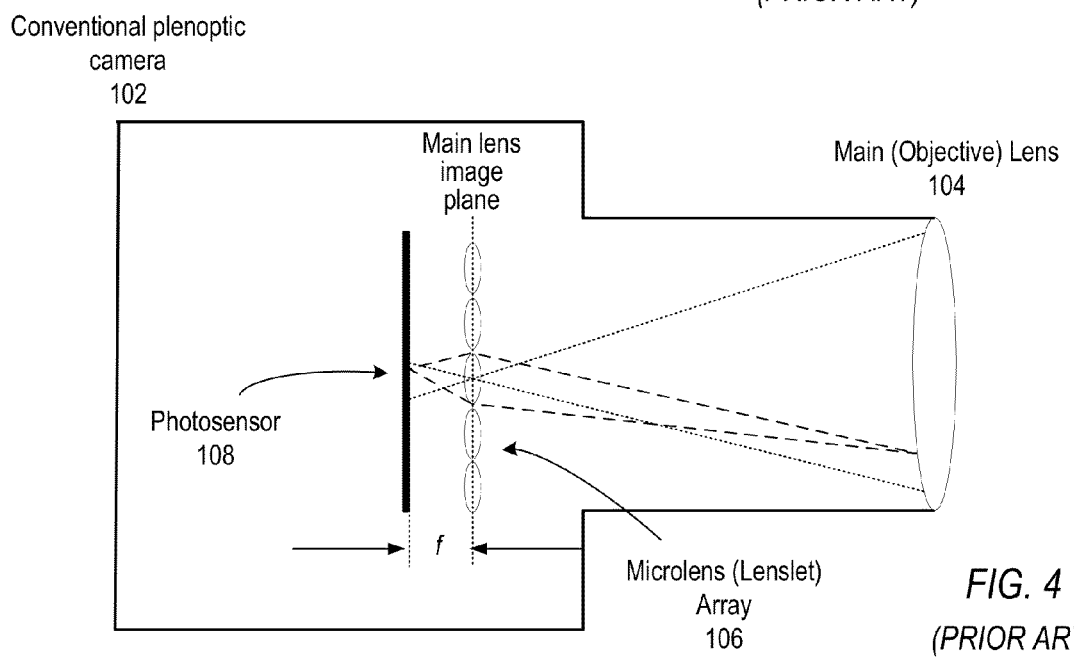
FIG. 4 further illustrates an example prior art plenoptic camera.

Various embodiments of a focused plenoptic camera are described. In conventional plenoptic cameras such as those illustrated in FIGS. 3 and 4, the microlenses are placed and adjusted accurately to be exactly at one focal length f from the photosensor, where f is the focal length of the microlenses. In addition, in conventional plenoptic cameras, the microlens array is fixed at the image plane of the main or objective lens of the camera, and the microlenses in the array are focused at infinity. In contrast, in embodiments of the focused plenoptic camera described herein, in order to increase or maximize spatial resolution, i.e., to achieve sharper, higher spatial resolution, microlens images, the microlenses are focused on the image created by the main lens inside the camera and in front of the microlenses (the image plane of the main lens), instead of being focused on the main lens itself, as in conventional plenoptic cameras. In further contrast to conventional plenoptic cameras, the microlenses in embodiments of the focused plenoptic camera described herein may be located at, or may be moved to, distances greater than for less than f from the photosensor, where f is the focal length of the microlenses. In one embodiment, the array of microlenses may be placed at distance $\frac{4}{3}$ f from the photosensor. Other embodiments may place the array of microlenses at other distances that are multiples of f e.g. 1.5 f or $\frac{3}{4}$ f. In addition, embodiments of focused plenoptic cameras in which the distance of the microlens array from the photosensor is variable or adjustable, and in which other characteristics of the camera may be adjustable, are described. For example, in one embodiment, the distance of the microlens array from the photosensor may be adjustable within the range 0.5 f to 1.5 f. For the Keplerian telescopic case (the distance of the microlens array from the photosensor >f), a maximum useful distance may be 1.5 f, although distances greater than 1.5 f may be possible, if not practical. Thus, for the Keplerian telescopic case, a practical range for the distance of the microlens array from the photosensor may be f<b≦1.5 f.

Various embodiments of the focused plenoptic camera implemented in digital cameras and in film cameras are anticipated, and example embodiments of both types are described. In digital cameras, the photosensor is a digital light-capturing device or medium such as a charge-coupled device (CCD) that captures and records the light in digital format. In film cameras, the photosensor is a film. Thus, "photosensor" as used herein refers to digital media that are used in digital cameras to capture light and to film media that are used in film cameras to capture light, and more generally to any device or medium that may be used to capture light. Light-field images captured on a film using film camera embodiments may subsequently be digitized, for example using a high-resolution scanner, so that the captured light-field may be rendered, for example using the full-resolution light-field rendering method described herein, to produce high-resolution output images. Light-field images captured using digital camera embodiments may be directly rendered.

In addition to digital and film embodiments, fixed and adjustable embodiments of both digital camera and film camera embodiments of the focused plenoptic camera are anticipated, and example embodiments of both types are described. In a fixed embodiment, the photosensor and the microlens array are at a fixed distance b from each other (the distance b is a multiple of f, for example $\frac{4}{3}$ f $\frac{3}{4}$ f, or 1.5 f, where f is the focal length of the microlenses). Note that b is used herein to designate the distance between the microlenses and the photosensor, while a is used herein to designate the distance between the microlenses and the image plane of the main or objective lens. In some embodiments, the microlens array/photosensor combination may be fixed at a location in the camera body. In some embodiments, the microlens array may be fixed in optical characteristics as well as in its physical location. In some embodiments, the main lens of the camera may also be fixed in optical characteristics and location, while possibly allowing for changes in shutter speed, aperture, focusing, etc. In adjustable embodiments, various manual or automatic mechanisms may be employed to change the distance b between the photosensor and the microlens array, to change the location of the microlens array/photosensor combination in the camera body, to change the distance from the main lens to the microlens array, to change the distance a between the microlenses and the image plane, and/or to swap or replace various components such as the microlens array and the main lens. In addition, the main lens of the camera may be swappable to use different main lenses, and may be adjustable according to aperture, shutter speed, focusing, distance from the microlens array, and so on. Embodiments where the microlens array may be swappable, so that microlens arrays with different numbers of microlenses and/or microlenses with different optical characteristics may be used, are also possible.

The optical characteristics of the optical system, including the optical characteristics of the lenses and the distances between the various components or elements, is important in capturing light-fields that may be rendered to yield high-resolution output images as described herein. Thus, in fixed embodiments, the microlenses, main lens, photosensor, and the relative physical location of these components in the camera may be determined according to the formulas and equations described herein to capture appropriate and satisfactory light-field images. In adjustable embodiments, some embodiments may include automated mechanisms that automatically adjust the positioning or other aspects of one or more of the components to capture appropriate and satisfactory light-field images. For example, if the user adjusts or replaces one component, the camera may automatically adjust one or more other components to compensate for the change. Alternatively, a human operator of an adjustable focused plenoptic camera may manually adjust the positioning or other aspects of one or more of the components, may replace one or more components with units that have different characteristics, or may insert other components (e.g., microsheet glass, as described below) to capture appropriate and satisfactory light-field images.

Figure 6:
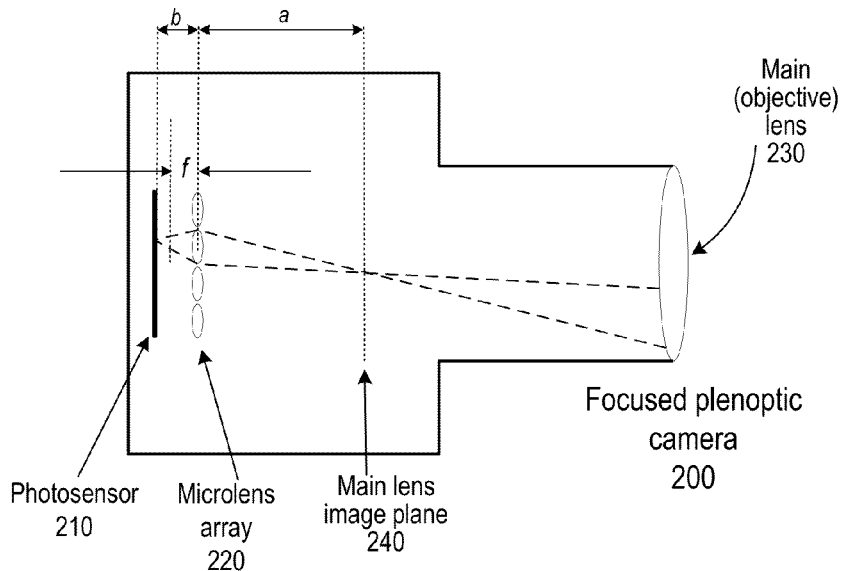
FIG. 6 is a block diagram illustrating a focused plenoptic camera according to one embodiment.
Figure 7:
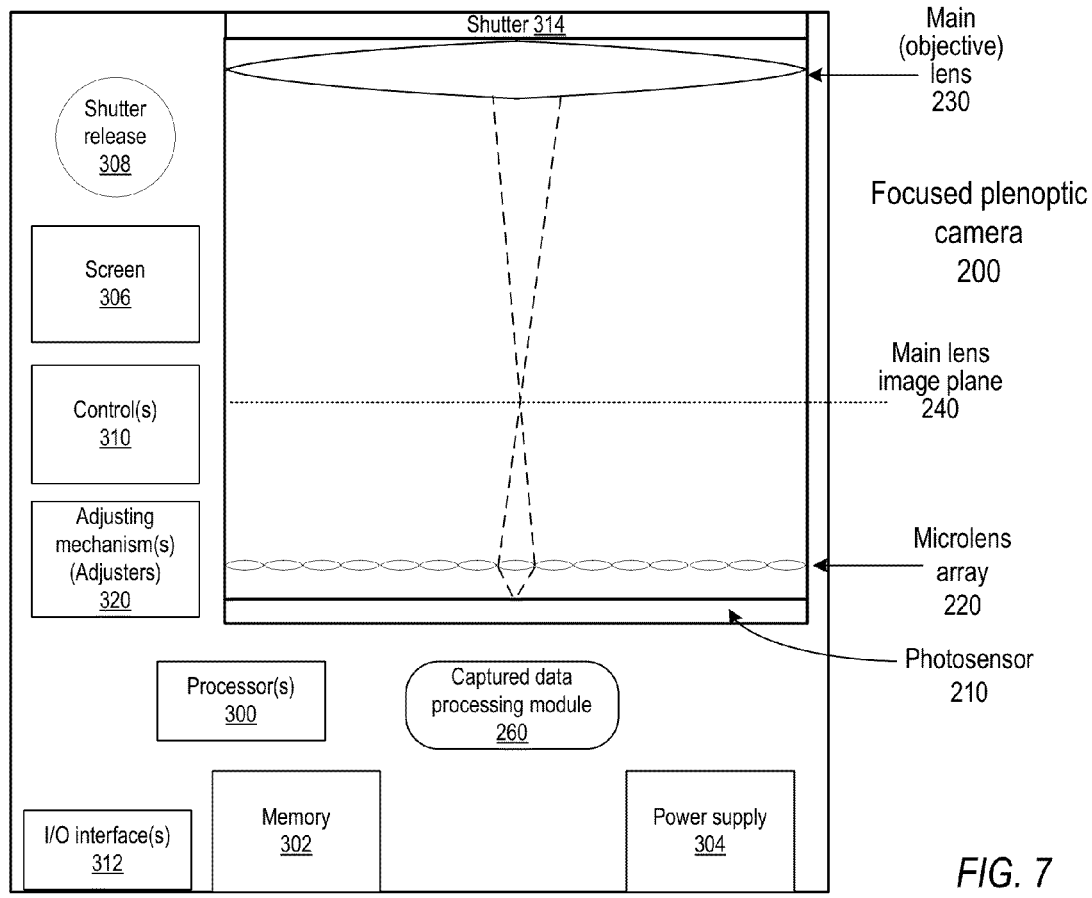
FIG. 7 illustrates an example embodiment of a focused plenoptic camera with various other elements that may be integrated in the camera.
Figure 8:
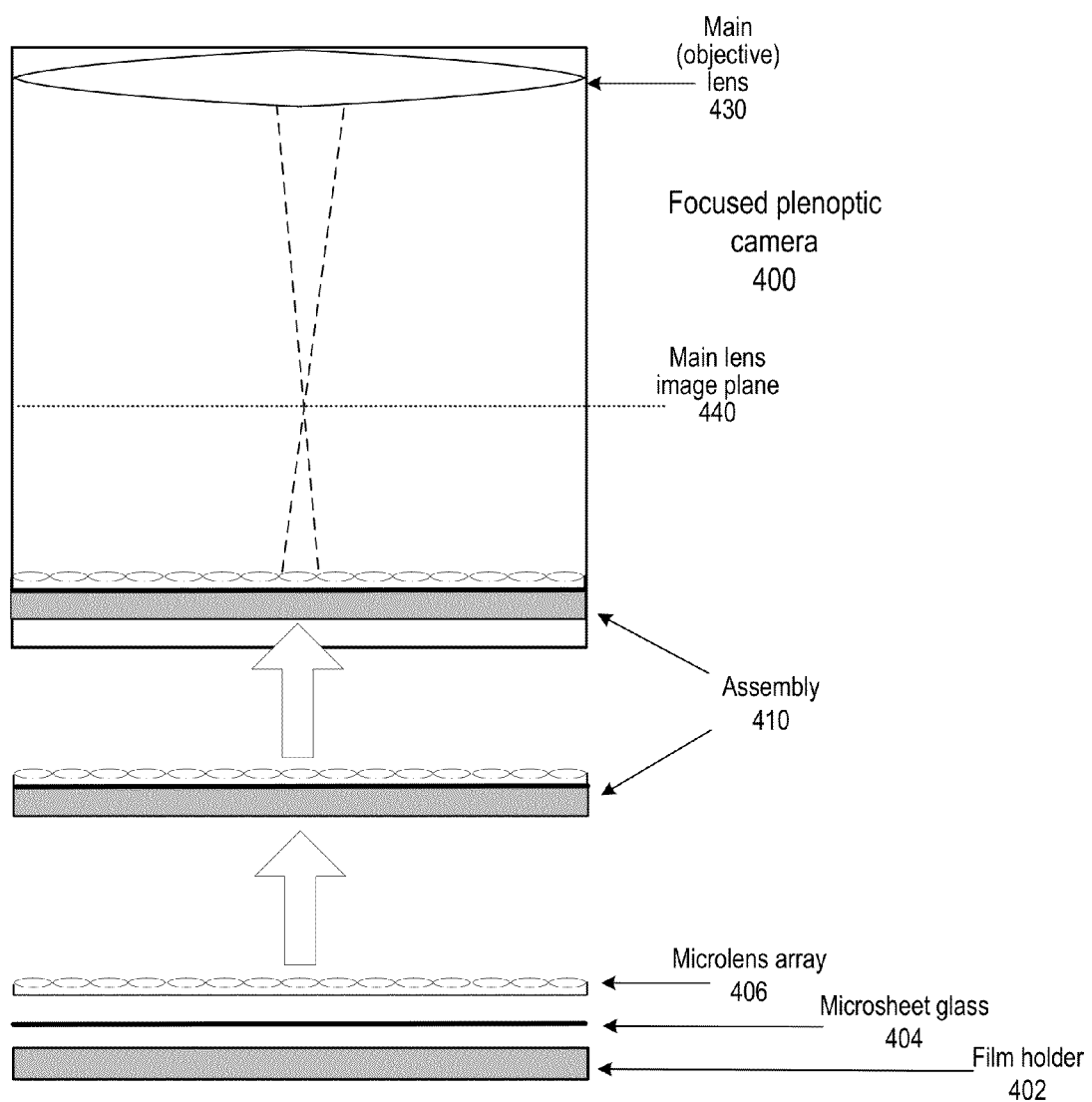
FIG. 8 illustrates an example embodiment of a focused plenoptic camera based on a large-format film camera.

FIGS. 6 through 8 illustrate example film camera and digital camera embodiments of a focused plenoptic camera as described herein, and further illustrate both fixed and adjustable embodiments of the focused plenoptic camera. It is noted that these are example embodiments, and are not intended to be limiting. Other embodiments are possible and anticipated.

FIG. 6 is a block diagram illustrating a focused plenoptic camera according to one embodiment. Focused plenoptic camera 200 may include a main (objective) lens 230, a microlens array 220, and a photosensor 210. Microlens array 220 may be located at a distance greater than f from photosensor 210, where f is the focal length of the microlenses in array 220. In addition, the microlenses in array 220 are focused on the image plane 240 of the main lens 230. In contrast, in conventional plenoptic cameras such as plenoptic camera 102 of FIGS. 3 and 4, the microlens array 106 is fixed at distance f from photosensor 108, and the microlenses in array 106 are focused on the main lens 104. In some embodiment, photosensor 210 may be conventional film; in other embodiments, photosensor 210 may be a device for digitally capturing light, for example a CCD. In one embodiment of a microlens array 220 that may be used in embodiments of focused plenoptic camera 200, or in other embodiments as illustrated in FIGS. 7 and 8, the microlens array 220 may include 146,000 microlenses of diameter 0.25 mm and focal length 0.7 mm. Other configurations of microlens array 220, including different numbers of microlenses and/or microlenses with different optical characteristics, are possible and anticipated. FIG. 16 shows a zoom into an example microlens array, and shows individual microlenses and (black) chromium mask between the microlenses.

FIG. 7 illustrates an example embodiment of focused plenoptic camera 200 with various other elements that may be integrated in the camera 200. In some embodiments of focused plenoptic camera 200, the objective lens 230, the microlens array 220, and the photosensor 210 may be fixed. In other embodiments, one or more of the above elements may be replaceable and/or adjustable. In some embodiment, photosensor 210 may be conventional film; in other embodiments, photosensor 210 may be a device for digitally capturing light, for example a CCD. In general, embodiments of a focused plenoptic camera 200 as described herein may include, in addition to main lens 230, microlens array 220, and photosensor 210, any other type of elements and features commonly found in digital cameras or other cameras including light-field and plenoptic cameras and large-format film cameras, and may also include additional elements and features not generally found in conventional cameras.

Figure 24:
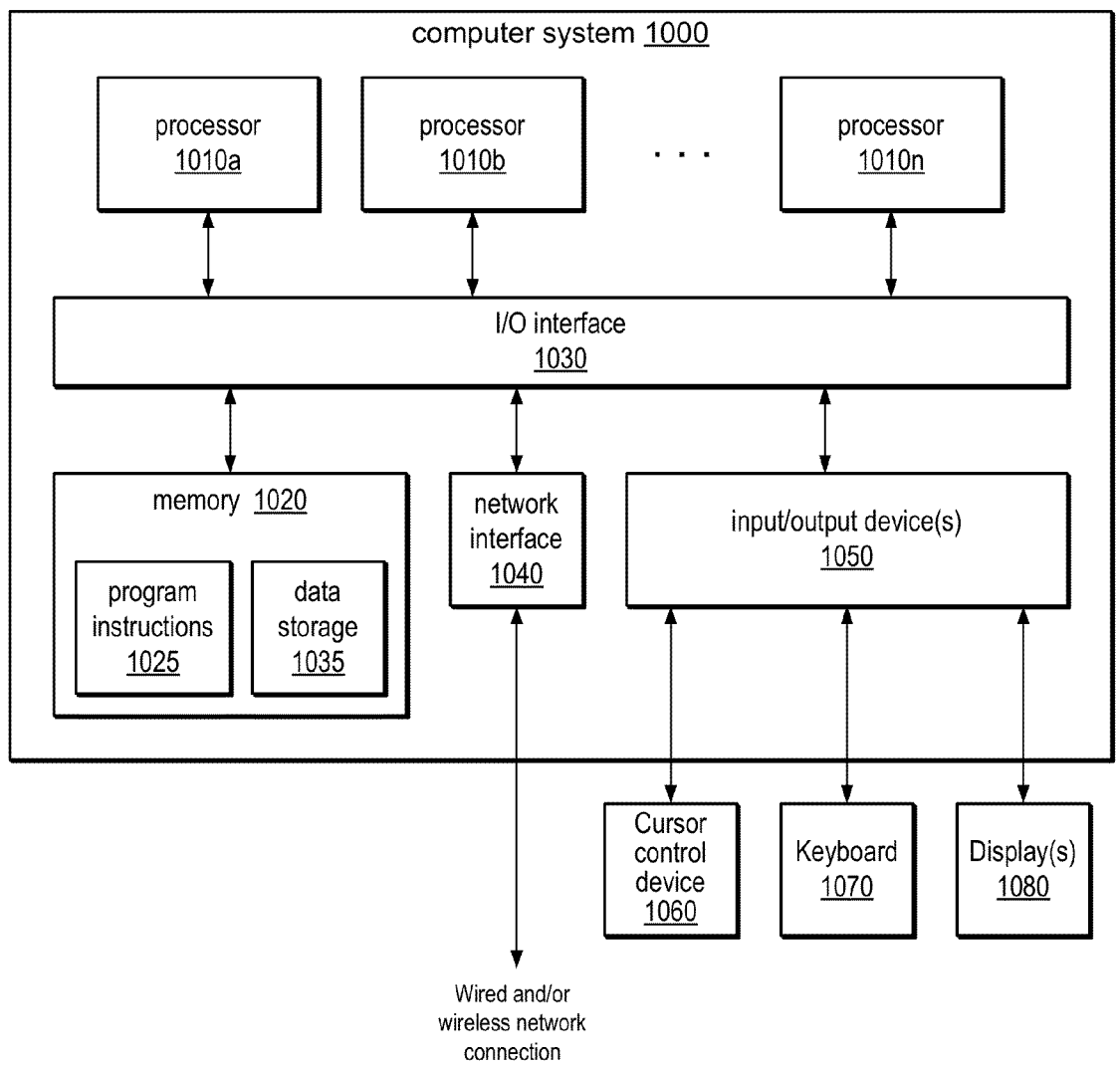
FIG. 24 illustrates an example computer system that may be used in embodiments.

In one embodiment, a full-resolution light-field rendering method for rendering high-resolution images from light-fields captured by focused plenoptic camera 200, and/or other image processing algorithms for application to light-fields captured by embodiments of focused plenoptic camera 200, may be implemented in captured data processing module 260. Captured data processing module 260 may be implemented in hardware, software, or a combination thereof. Alternatively, light-fields captured by focused plenoptic camera 200 may be rendered according to the full-resolution light-field rendering method implemented in a rendering module executing on a separate device, e.g. a computer system, to generate one or more high-resolution output images of a captured scene, as described herein. An example computer system in which embodiments of the full-resolution light-field rendering method may be implemented is illustrated in FIG. 24.

A focused plenoptic camera 200 may include a shutter 314. Shutter 314 may be located in front of or behind objective lens 230. A focused plenoptic camera 200 may include one or more processors 300. A focused plenoptic camera 200 may include a power supply or power source 304, such as one or more replaceable or rechargeable batteries. A focused plenoptic camera 200 may include a memory storage device or system 302 for storing captured light-field images and/or rendered final images or other information such as software. In one embodiment, the memory 302 may be a removable/swappable storage device such as a memory stick. A focused plenoptic camera 200 may include a screen 306 (e.g., an LCD screen) for viewing scenes in front of the camera prior to capture and/or for viewing previously captured and/or rendered images. The screen 306 may also be used to display one or more menus or other information to the user. A focused plenoptic camera 200 may include one or more I/O interfaces 312, such as FireWire or Universal Serial Bus (USB) interfaces, for transferring information, e.g. captured light-field images, software updates, and so on, to and from external devices such as computer systems or even other cameras. A focused plenoptic camera 200 may include a shutter release 308 that is activated to capture a light-field image of a subject or scene.

A focused plenoptic camera 200 may include one or more controls 310, for example controls for controlling optical aspects of the focused plenoptic camera 200 such as shutter speed, one or more controls for viewing and otherwise managing and manipulating captured images stored in a memory on the camera, etc. An adjustable focused plenoptic camera 200 may include one or more controls for adjusting the relative location of (the distance between) the components in the camera 200, such as the distance b between microlens array 220 and photosensor 210. An adjustable focused plenoptic camera 200 may include one or more manual or automatic adjusting mechanism(s) 320, or adjusters, configured to adjust the relative location of (the distance between) the components in the camera 200, such as the distance b between microlens array 220 and photosensor 210. In some embodiments, the adjusting mechanisms 320 may act to adjust one or more components responsively to controls 310.

FIG. 8 illustrates an example embodiment of a focused plenoptic camera 200 based on a large-format film camera. In conjunction with current high-resolution scanners used to digitize captured images from negatives or prints, large-format film camera embodiments are capable of up to 1 gigapixel, or even higher, resolution for the flat (a flat is a 2D representation of the 4D radiance). An example embodiment may, for example, be implemented in large-format film camera using a 135 mm objective lens 430 and 4×5 format film as the "photosensor" (in large-format cameras, single negatives of film are generally placed in a film holder 402 or cartridge that can be inserted into and removed from the camera body). Other objective lenses and/or other film formats, for example 8×10 format film, may be used in various embodiments. Focused plenoptic camera 400 includes a microlens array 406. FIG. 16 shows a zoom into an example microlens array, and shows individual microlenses and (black) chromium mask between the microlenses. In one embodiment of a microlens array that may be used in embodiments of focused plenoptic camera 400, or in other embodiments as illustrated in FIGS. 6 and 7, the microlens array 406 may include 146,000 microlenses of diameter 0.25 mm and focal length 0.7 mm. Other configurations of microlens array 406, including different numbers of microlenses and/or microlenses with different optical characteristics, are possible and anticipated.

In one embodiment, a mechanism inside a film holder 402 of the large-format film camera holds the microlens array 406 so that the flat side of the glass base of the array 406 is pressed against the film. In one embodiment, the thickness of the microlens array 406 is such that, when placed against the film, the microlenses are distance f from the film. Other configurations of microlens arrays 406 are possible, and the configuration of the large-format film camera makes it possible to easily change configurations of microlenses by simply using a different microlens array 406. Microsheets 404 of glass may be used in the assembly as spacers or shims between the microlens array 406 and the film in film holder 402 to increase the distance from the microlenses and the film to be greater than f (e.g., 4⁄3 f). An example thickness of a microsheet 404 that may be used is 0.23 mm. Inserting microsheet glass 404 provides spacing in a rigorously controlled manner. In one embodiment, additional spacing may be created by adding a single microsheet 404 between the film holder 402 and the microlens array 406 in order to displace the microlenses by an additional 1⁄3 f, approximately 0.2 mm from the sensor. Additional microsheets 404 may be added to provide additional spacing. In some embodiments, other mechanisms than microsheet glass may be used as spacers between the microlens array 406 and film holder 402 to adjust the distance between the microlens array 406 and film holder 402.

As illustrated in FIG. 8, in one embodiment, the film holder 402 and microlens array 406 may be coupled to create assembly 410. One or more microsheets 404 may optionally be inserted between the film holder 402 and microlens array 406 to provide additional spacing as necessary or desired. The assembly 410 may then be inserted into the large-format film camera. The combination of the large-format film camera and the assembly 410 effectively forms a focused plenoptic camera 400. Focused plenoptic camera 400 may then be used to capture a flat of a scene on the film in film holder 402. A flat is a 2D representation of the 4D lightfield. The assembly 410 may then be removed from the camera 400, disassembled, and the film may be appropriately processed. The film negative and/or a print of the flat may then be digitized, for example using a high-resolution scanner or a device that generates digital images from negatives. The digitized flat may be stored to a storage device, such as a disk drive, DVD, CD, etc. The digitized flat may be rendered according to the full-resolution light-field rendering method, implemented in a rendering module executing on a computer system, to generate one or more high-resolution output images of the scene as described herein. An example computer system in which embodiments of the full-resolution light-field rendering method may be implemented is illustrated in FIG. 24.

An analysis of the full-resolution light-field rendering methods and apparatus provided herein shows that focusing the microlenses on the image plane of the main lens in the focused plenoptic camera, rather than focusing on the main lens itself as in conventional plenoptic cameras, enables embodiments of the full-resolution light-field rendering methods and apparatus to more fully exploit positional information available in the captured flat (i.e., the 2D representation of the 4D light-field) captured by the light-field camera). Based on good focusing and high-resolution of the microlens images, embodiments of the described methods and apparatus are able to achieve very high-resolution of rendered images when compared to conventional plenoptic cameras and conventional rendering methods. For example, one embodiment achieves a 27× increase in resolution in each spatial dimension when compared to results from conventional plenoptic cameras and conventional rendering methods.

Full-Resolution Light-Field Rendering Method

Embodiments of a method and apparatus for rendering high-resolution images from a light-field, for example captured by embodiments of the focused plenoptic camera, are described. The method for rendering high-resolution images from the light-field may be referred to as a full-resolution light-field rendering method. The light-field rendering method may be referred to as full-resolution because the method makes full use of both positional and angular information available in the captured radiance data. The full-resolution light-field rendering method may be implemented as or in a tool, module, library function, plug-in, stand-alone application, etc. For simplicity, implementations of embodiments of the full-resolution light-field rendering method may be referred to as a rendering module. Alternatively, or in addition, other light-field rendering or processing techniques may be applied to captured flats by a rendering module, and/or by other modules. FIG. 24 illustrates an example computer system on which embodiments of a rendering module may be implemented.

A description of the full-resolution light-field rendering method and an analysis of the limits and tradeoffs of the method are presented. The effectiveness of the full-resolution light-field rendering method when compared to conventional methods may be demonstrated experimentally by rendering images from a 542-megapixel light-field using a conventional rendering approach and using the full-resolution light-field rendering method described herein. In the experiments, the conventional rendering methods produce a 0.146-megapixel final image, while the full-resolution light-field rendering method produces a 106-megapixel final image. Experimental results show that our method may produce full-resolution images that approach the resolution that would have been captured directly with a conventional (non-light-field) high-resolution camera.

Plenoptic Camera Modes of Behavior

The full-resolution light-field rendering method may be derived by analyzing the optical system of the plenoptic camera. First, some observations of captured flats, which are 2D representations of the 4D light-field, are presented, and these observations are used to motivate the subsequent analysis.

Figure 9:
FIG. 9 shows an example crop from a flat captured with a plenoptic camera.

FIG. 9 shows an example crop from a raw flat captured with a plenoptic camera. In FIG. 9, repeated edges inside multiple circles may be observed. Each microlens in the microlens array creates a microimage; the resulting flat is thus an array of microimages. On a large scale, the overall image may be perceived, whereas the correspondence between the individual microlens images and the large scale scene is less obvious. Interestingly, as will be shown, it is this relationship—between what is captured by the microlenses and what is in the overall scene—that may be exploited in embodiments to create high-resolution images.

In FIG. 9, on a small scale, a number of clearly distinguishable features inside the circles, such as edges, may be observed. Edges are often repeated from one circle to the next. The same edge (or feature) may be seen in multiple circles, in a slightly different position that shifts from circle to circle. If the main camera lens is manually refocused, a given edge can be made to move and, in fact, change its multiplicity across a different number of consecutive circles.

Repetition of features across microlenses is an indication that that part of the scene is out of focus. When an object from the large-scale scene is in focus, the same feature appears only once in the array of microimages.

In interpreting the microimages, it is important to note that, as with the basic conventional camera described above, the operation of a basic plenoptic camera is far richer than a simple mapping of the radiance function at some plane in front of the main lens onto the sensor. That is, there are an essentially infinite number of mappings from the scene in front of the lens onto the image sensor. For one particular distance, this corresponds to a mapping of the radiance function. What the correspondence is for parts of the scene at other distances—as well as how they manifest themselves at the sensor—is less obvious. This will be the topic of the remaining part of this section.

Next, two limiting cases are considered which can be recognized in the behavior of the plenoptic camera: Keplerian telescopic (where the distance between the photosensor and the microlens array, b, is greater than the focal length f of the microlenses in the array) and Galilean telescopic (also referred to as binocular) (where b is less than f). Neither of those cases is exact for a true plenoptic camera, but their fingerprints can be seen in every plenoptic image. As will be show, both are achievable, and are very useful.

Plenoptic Camera: Keplerian Telescopic Case

Figure 10:
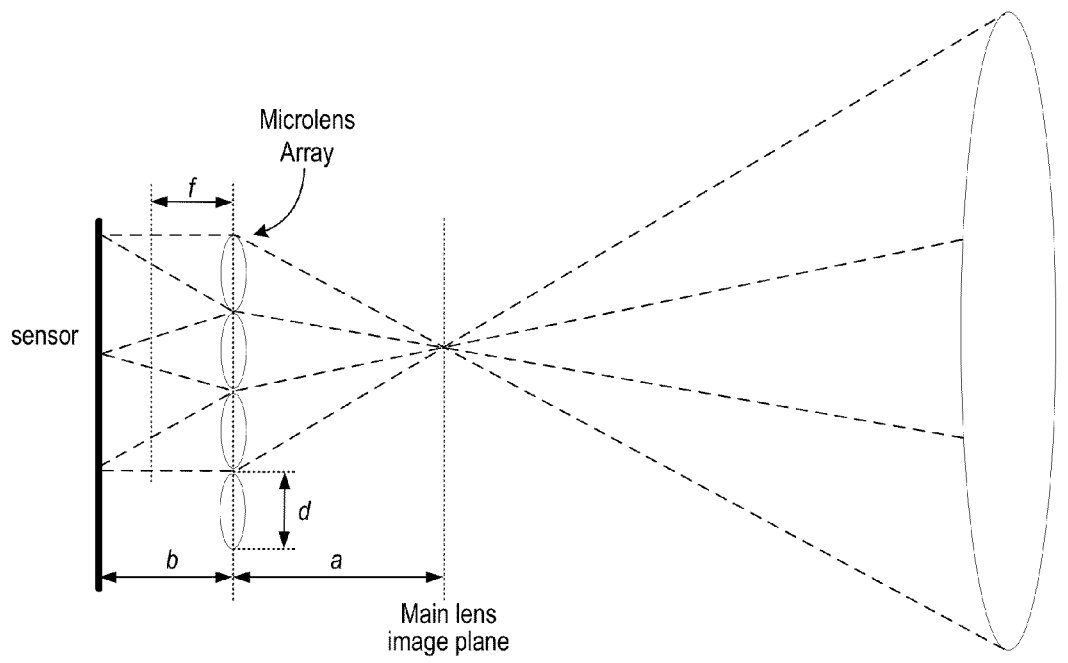
FIG. 10 illustrates the Keplerian telescopic case for a plenoptic camera.

FIG. 10 illustrates the Keplerian telescopic case (b>f) for a plenoptic camera. A plenoptic camera may be considered as an array of (Keplerian) telescopes with a common objective lens. (For the moment the issue of microlenses not being exactly focused for that purpose will be ignored.) Each individual telescope in the array has a microcamera (an eyepiece lens and the eye) inside the big camera. Just like any other camera, this microcamera is focused onto one single plane, and maps the image from the plane onto the retina, inverted and reduced in size. A camera can be focused only for planes at distances ranging from f to infinity (∞) according to the lens equation:

$$\frac{1}{a} + \frac{1}{b} = \frac{1}{f}$$

Here, a, b, and f have the same meaning as for the big camera, except on a smaller scale. It can be seen that since a and b must be positive, it is not possible to focus closer than f. In a conventional plenoptic camera, the image plane is fixed at the microlenses. It may be more natural to consider the image plane fixed at distance f in front of the microlenses. In both cases, microimages are out of focus.

Figure 11:
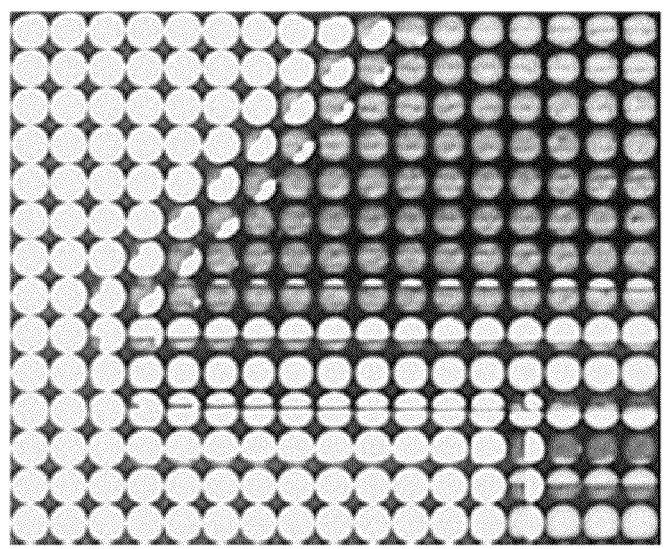
FIG. 11 shows a crop from the roof area in FIG. 9, and visually illustrates the Keplerian telescopic behavior in light-field cameras.

Following the movement of an edge from circle to circle, characteristic behavior of Keplerian telescopic imaging in the flat may be observed. FIG. 11 shows a crop from the roof area in FIG. 9. FIG. 11 may be used to visually illustrate the Keplerian "telescopic" behavior. It is possible to observe in FIG. 11 that the edge is repeated two times when moving away from the roof. The farther from the roof a circle is, the farther the edge appears inside that circle. Moving in any given direction, the edge moves relative to the circle centers in the same direction. Once detected in a given area, this behavior is consistent (valid in all directions in that area). Careful observation shows that images in the small circles are indeed inverted patches from the high-resolution image, as if observed through a telescope.

For the Keplerian telescopic case, a practical range for b may be f<b≦1.5 f.

Plenoptic Camera: Galilean Telescopic (Binocular) Case

Figure 12:
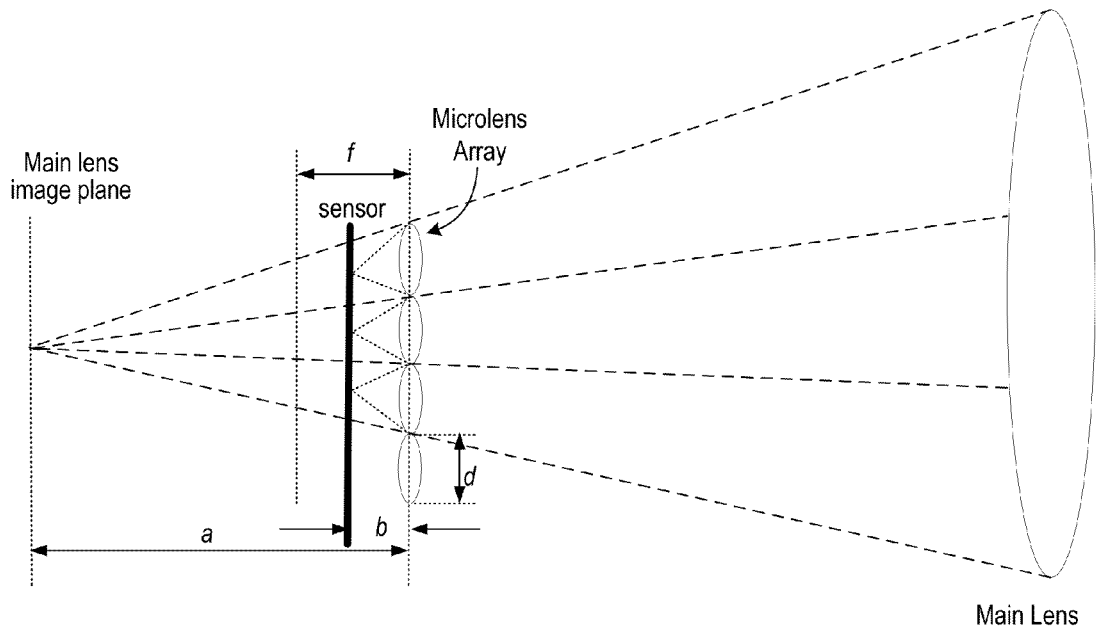
FIG. 12 illustrates the Galilean telescopic case for a plenoptic camera.
Figure 13:
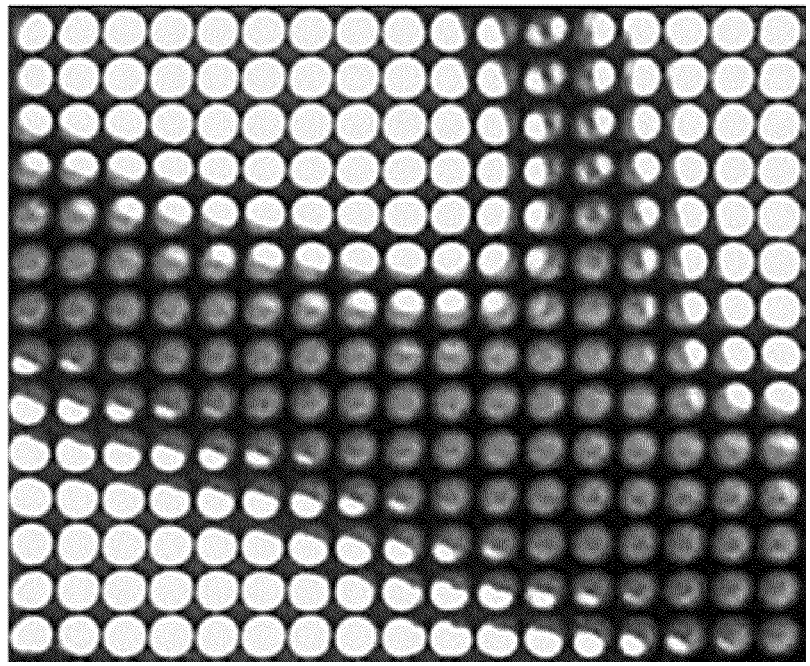
FIG. 13 shows a crop from the tree area in FIG. 9, and visually illustrates the Galilean telescopic behavior in light-field cameras.

FIG. 12 illustrates the Galilean telescopic, or binocular, case (b<f) for a plenoptic camera. FIG. 13 shows a crop from the tree area in FIG. 9, and is used to illustrate details of Galilean telescopic imaging in light-field cameras. Note that the image is not inverted in FIG. 13. A plenoptic camera may also be considered as an "incompletely focused" camera, i.e., a camera focused behind the film plane (as in a Galilean telescope and in binoculars). If an appropriate positive lens is placed in front of the film, the image would be focused on the film. For a Galilean telescope, this is the lens of the eye that focuses the image onto the retina. For a plenoptic camera, this role is played by the microlenses with focal length f. In the Galilean telescopic case, the microlenses would need to be placed at a distance smaller than f from the film. Note also that while the Keplerian telescopic operation inverts the inside image, the Galilean telescopic operation does not invert it.

As with Keplerian telescopic imaging, characteristic behavior of Galilean telescopic imaging can be observed in the plenoptic camera. See FIG. 13, which is a crop from the top left corner in FIG. 9. In FIG. 13, it can be observed that edges are repeated about two or three times when moving away from the branch. The farther from the branch, the closer to the branch the edge appears inside the circle. Moving in any given direction, the edge moves relative to the circle centers in the opposite direction. Once detected in a given area, this behavior is consistent (valid in all directions in that area). This is due to the depth in the image at that location. Careful observation shows that images in the small circles are in fact patches from the corresponding area in the high-resolution image, only reduced in size. The more times the feature is repeated in the circles, the smaller it appears and thus a bigger area is imaged inside each individual circle.

To summarize, an approximately focused plenoptic camera (i.e., a plenoptic camera where b≠f) may be considered as an array of microcameras looking at an image plane in front of the array or behind the array. Each microcamera images only a small part of that plane. The shift between those small images is obvious from the geometry, as explained below in the section titled Analysis. If at least one microcamera could image this entire plane, it could directly capture a high-resolution image. However, the small images are limited in size by the main lens aperture.

The magnification of these microcamera images, and the shift between them, is defined by the distance to the image plane. This distance can be at positive or negative distance from the microlenses, corresponding to the Keplerian telescopic (positive) and Galilean telescopic (negative) cases described above. By slightly adjusting the plane of the microlenses (so that the lenses are in focus), embodiments can make use of the Keplerian telescopic or Galilean telescopic behavior to generate a high-resolution image from the flat. This process is described in the following sections.

Analysis

In some embodiment, microlenses may not be focused exactly on the plane that is to be imaged, causing the individual microlens images to be blurry. This may limit the amount of resolution that can be achieved. One way to improve such results would be deconvolution. Another way would be to stop down the microlens apertures.

In FIGS. 14A and 14B, the case of a "plenoptic" camera using a pinhole array instead of microlens array is considered.

In FIGS. 14A and 14B, an array of pinholes (or microlenses) maps the image in front of the array to the sensor. The distance to the image defines the magnification factor M=n−1. In ray optics, in theory, pinhole images produce no defocus blur, and in this way are perfect. But this is in theory; in the real world, pinholes are replaced with finite but small apertures and microlenses.

From the lens equation:

$$\frac{1}{a} + \frac{1}{b} = \frac{1}{f}$$

it can be seen that, if the distance to the object is a=nf, the distance to the image would be:

$$b = \frac{nf}{n-1}$$

$$n = \frac{b}{b-f}$$

The geometric magnification factor may be defined as M=a/b, which by substitution gives:

$$M = n-1$$

FIG. 14A shows the ray geometry in the Keplerian telescopic case for n=4, and FIG. 14B shows the ray geometry in the Keplerian telescopic case for n=2. Note that the distance b from the microlenses to the sensor is always greater than f (this is not represented in FIGS. 14A and 14B). Looking at the geometry in FIGS. 14A and 14B, the images are M times smaller, inverted, and repeated M times.

Full-Resolution Light-Field Rendering Algorithm

Two distinct behaviors (Keplerian telescopic and Galilean telescopic) are described above, and embodiments of the full-resolution light-field rendering method may execute a different action based on which behavior is observed in the microimages contained in the flat captured by a focused plenoptic camera. In one embodiment, if the full-resolution light-field rendering method detects edges (or features) moving relative to the microimage centers (the microimages are generally circular, so may be referred to as circles) in the same direction as the direction of movement, all microimages in that area are inverted relative to their individual centers (this is the Keplerian telescopic case). If the full-resolution light-field rendering method detects edges moving relative to the microimage centers in a direction opposite to the direction of movement, the method does nothing (this is the Galilean telescopic case). In some embodiments, examination of the microimages to determine the direction of movement of edges may be performed by a user via a user interface. The user may mark or otherwise indicate areas that the user determines need be inverted via the user interface. In some embodiments, examination of the microimages to determine the direction of movement of edges may be performed automatically in software.

The small circles, or microimages, in a flat are, effectively, puzzle pieces of the big image, and embodiments of the full-resolution light-field rendering method reproduce the big image by bringing the microimages sufficiently close together. The big image may also be reproduced by enlarging the pieces so that features from any given piece match those of adjacent pieces. Assembling the resized pieces reproduces exactly the high-resolution image.

In either of these approaches, the individual pieces may overlap. FIG. 15 illustrates a lens circle (or microimage) of diameter D and a patch of size $m_1 \times m_2$, where at least one of $m_1$ and $m_2$ is an integer greater than or equal to 2. Some embodiments of the full-resolution light-field rendering method avoid this overlapping by dropping all pixels outside a square of size $m_1 \times m_2$, effectively cropping the microimage to an $m_1 \times m_2$ square. Note that other embodiments may crop to other geometric shapes, such as a rectangle.

Conventional rendering methods do not reassemble pixels as described above; the conventional plenoptic camera algorithm produces one pixel per microlens for the output image. Embodiments of the full-resolution light-field rendering method, using the algorithm described above, produce a gain in resolution that is approximately equal to the number of pixels $m_1 \times m_2$ in the original patches. That is, embodiments produce $m_1 \times m_2$ pixels, instead of one pixel, per microimage It has been shown above that the magnification M=n−1. It is also the case that M=D/m. It therefore follows that:

$$n = 1 + \frac{D}{m}$$

From the above, the distance (measured in number of focal lengths) to the image plane in front of the microlens is related to D and m.

It is important to note that lenses produce acceptable images even when they are not exactly in focus. Additionally, out of focus images can be deconvolved, or simply sharpened. For those reasons, the above analysis is actually applicable for a wide range of locations of the image plane. Even if not optimal, such a result is often a useful tradeoff.

The optics of the microlens as a camera is the main factor in determining the quality of each microimage. Blurry images from optical devices may be deconvolved and the sharp image recovered to some extent. In order to do this, the effective kernel of the optical system should be known. While there are limitations in this related to bit depth and noise, embodiments may increase resolution up to $m_1 \times m_2$ times the resolution of a conventional plenoptic camera and conventional rendering method. Example embodiments have demonstrated a 27× increase of resolution in one plane, and a 10× increase of resolution in another plane, when compared to conventional methods and apparatus, and without any deconvolution. Other embodiments may yield other increases in resolution when compared to conventional methods and apparatus.

Example Results

Some embodiments of a focused plenoptic camera as described herein may be implemented in film cameras. Embodiments may, for example, be implemented in large-format film cameras. An example large-format film camera embodiment is illustrated in FIG. 8. One example embodiment may, for example, be implemented in large-format film camera using a 135 mm objective lens and 4×5 format film. A focused plenoptic camera based on a large-format film camera rather than on a digital camera may be used for experimental purposes in order to avoid resolution constraint of digital sensors. However, film camera embodiments of the focused plenoptic camera design are practical and may have practical applications. In conjunction with current high-resolution scanners used to digitize captured images from negatives or prints, large-format film camera embodiments are capable of 1 gigapixel, or even higher, resolution for the flat (2D) representation of the 4D radiance (the raw flat).

A component of the focused plenoptic camera is a microlens array. FIG. 16 shows a zoom into an example microlens array, and shows individual microlenses and (black) chromium mask between the microlenses. In one embodiment of a microlens array that may be used in the example embodiment based on a large-format film camera, the microlens array includes 146,000 microlenses of diameter 0.25 mm and focal length 0.7 mm. A mechanism inside a 4×5 inch film holder of the large-format film camera holds the microlens array so that the flat side of the glass base is pressed against the film. In one embodiment, the thickness of the microlens array is such that, when placed against the film, the microlenses are distance f from the film. Other configurations of microlens arrays are possible, and the configuration of the large-format film camera makes it possible to easily change configurations of microlenses by simply using a different microlens array. Microsheets of glass may be used in the assembly as spacers or shims between the microlens array and the film to increase the distance from the microlenses and the film to be greater than f (e.g., 4/3 f). An example thickness of a microsheet that may be used is 0.23 mm. Inserting microsheet glass provides spacing in a rigorously controlled manner. In one embodiment, additional spacing may be created by adding a single microsheet between the film and the microlenses in order to displace the microlenses by an additional 1/3 f, approximately 0.2 mm from the sensor. Additional microsheets may be added to provide additional spacing.

Experiments may be conducted both with and without inserting microsheets of glass as spacers or shims between the microlens array and the film in the example film camera used for testing. In both cases, the focal length of the microlenses is f=0.700 mm. The spacing in two experimental conditions differ as follows:

b=0.71 mm so that n=71 and M=70, which is made possible directly by the thickness of glass of the microlens array assembly itself; and b=0.94 mm based on microsheet glass between microlens array and film. As a result, n=3.9 (almost 4) and M=3, approximately.

High-Resolution Rendering Methods and Results

FIGS. 17 through 20 are used to illustrate experimental results from applying the full-resolution rendering method to flats captured with the example focused plenoptic camera based on a large-format film camera described above. In particular, the operation of rendering in both the Keplerian telescopic case and the Galilean telescopic case is illustrated and described.

Figure 17:
FIG. 17 shows a portion of a digitized flat.

The original, unrendered flat was generated by capturing the image on film using the example focused plenoptic camera based on a large-format film camera, and digitizing the image via a scanning process using a high-resolution scanner. A portion of the digitized flat is shown in FIG. 17. After digitization, the full original flat is 24,862×21,818 pixels, of which 2,250×1,950 pixels are shown in FIG. 17. The approximate region of the original flat extracted to produce FIG. 17 is shown by small solid white rectangle in FIG. 18C.

Figure 18A:
FIGS. 18A through 18C show output images rendered from a flat using conventional rendering methods.
Figure 18B:
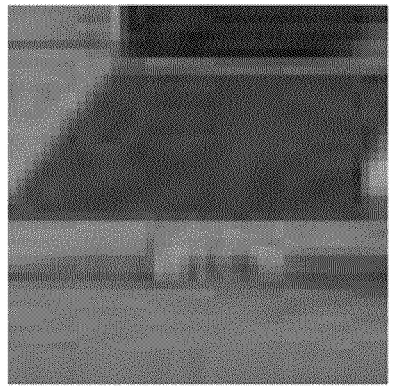
Figure 18C:

Output images rendered from the flat using conventional rendering methods are shown in FIGS. 18A through 18C. The entire flat was rendered with the conventional method, resulting in a 408×357 pixel image. FIG. 18A is rendered at 300 ppi, while FIG. 18C is rendered at 72 ppi. At 300 ppi, the image is only about 1 inch by 1 inch. FIG. 18B shows a 27× magnification of a crop of the curb area from the 300 ppi image in FIG. 18A. The solid white rectangle in FIG. 18C shows the region from the light-field shown in FIG. 17. The dashed white rectangle in FIG. 18C shows a region that is rendered according to an embodiment of the full-resolution light-field method as shown in FIGS. 19 and 20.

Figure 19:
FIG. 19 shows a full-resolution rendering of a light-field, rendered assuming the Keplerian telescopic case according to one embodiment of the full-resolution light-field rendering method.

FIG. 19 show a full-resolution rendering of the experimental light-field, rendered assuming the Keplerian telescopic case according to one embodiment of the full-resolution light-field rendering method described herein. This region of the image is shown by the dashed white rectangle in FIG. 18C. For this rendering, the scaling-down factor was taken to be approximately 2.4, so that the full-resolution rendered image measured 11016×9666, i.e., over 100 megapixels. Even though the image is at 300 dpi, only a 2,250×1,950 region is shown in FIG. 19. The image is well-focused at full-resolution in the region of the house, but not well-focused on the tree branches.

Figure 20:
FIG. 20 shows a full-resolution rendering of a light-field, rendered assuming the Galilean telescopic case according to one embodiment of the full-resolution light-field rendering method.

FIG. 20 shows a full-resolution rendering of the experimental light-field, rendered assuming the Galilean telescopic case according to one embodiment of the full-resolution light-field rendering method described herein. This region of the image is shown by the dashed white rectangle in FIG. 18C. Note that, in contrast to the image in FIG. 20, this image is well-focused at full-resolution in the region of the tree branches but not well-focused on the house.

Figure 21:
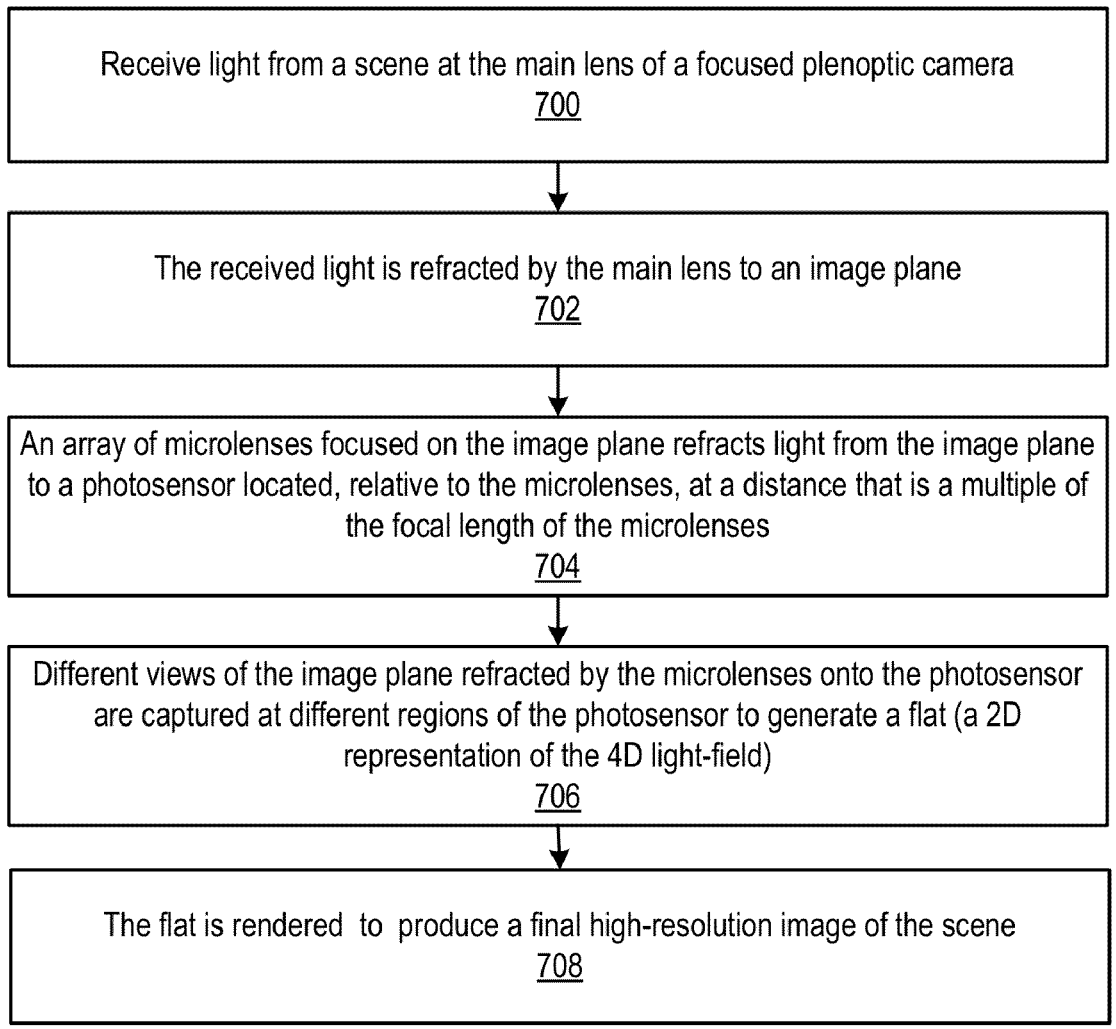
FIG. 21 is a flow chart illustrating how light is directed within a focused plenoptic camera according to one embodiment.

FIG. 21 is a flow chart illustrating how light is directed within a focused plenoptic camera according to one embodiment. As indicated at 700, light from a scene is received at the main lens of a focused plenoptic camera. FIGS. 6, 7 and 8 illustrate example focused plenoptic cameras. As indicated at 702, the received light is refracted by the main lens to an image plane. As indicated at 704, an array of microlenses, the microlenses of which are focused on the image plane, refracts light from the image plane onto a photosensor located, relative to the microlenses, at a distance that is a multiple of the focal length f of the microlenses. For example, the distance between the microlenses and the photosensor may be 3/4 f, 4/3 f, 5/3 f, 1.5 f, and so on. As indicated at 706, different views of the image plane, refracted by the microlenses onto the photosensor, are captured at different regions of the photosensor to generate a flat, which is a 2D representation of the 4D light-field. In some embodiments, the photosensor may be a device configured to digitally capture light such as a CCD, while in other embodiments the photosensor may be conventional film. As indicated at 708, the captured flat may be rendered to produce a final high-resolution image, or images, of the scene, for example using a full-resolution light-field rendering method as described in FIG. 22. For flats captured on conventional film, the flat may be digitized to generate a digitized flat before rendering.

Figure 22:
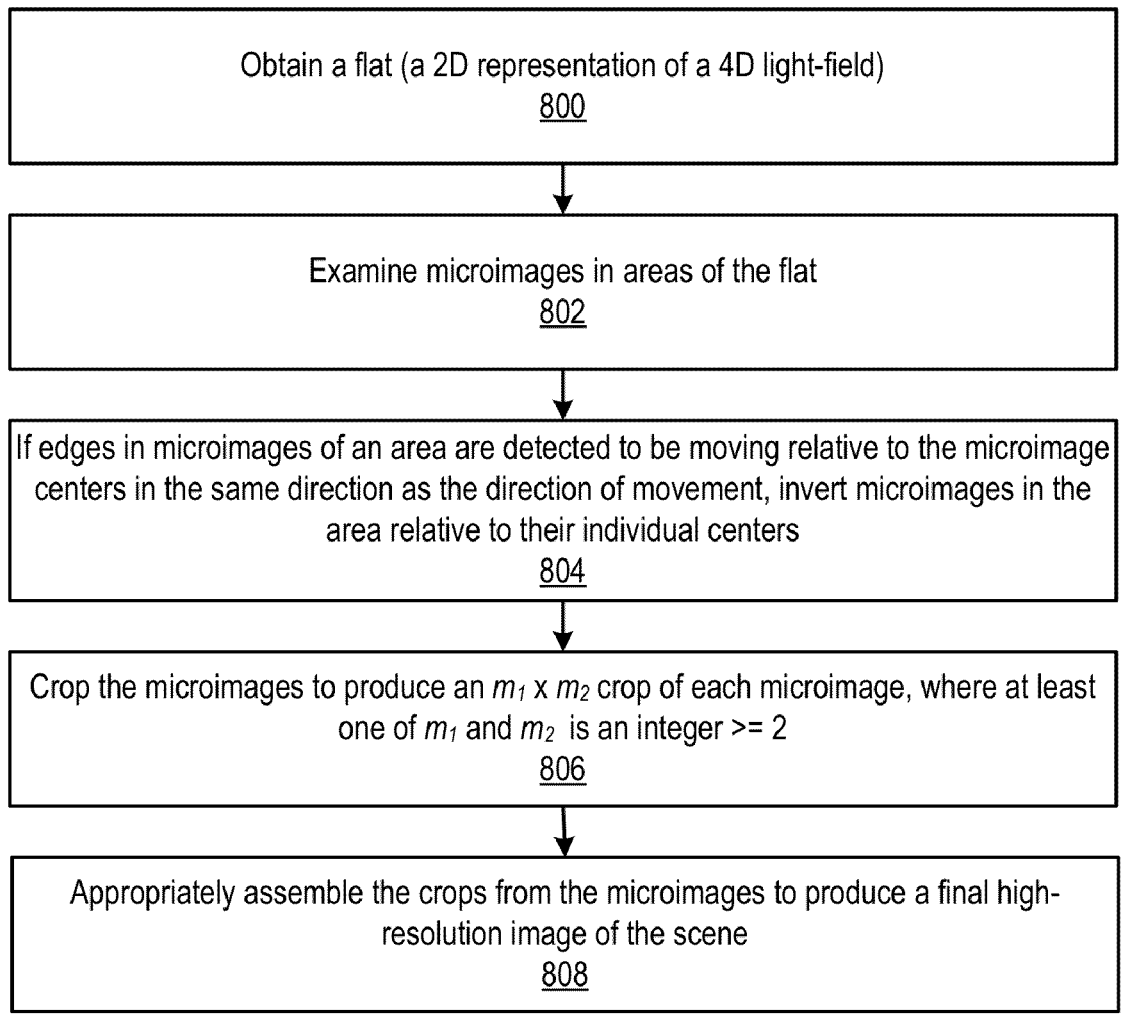
FIG. 22 is a flowchart of a full-resolution light-field rendering method according to one embodiment.

FIG. 22 is a flowchart of a full-resolution light-field rendering method according to one embodiment. As indicated at 800, a flat captured by a focused plenoptic camera may be obtained (see, e.g., FIG. 9 for an example of what such a flat may look like to a human observer). As indicated at 802, microimages in areas of the flat may be examined (manually or automatically, as described below) to determine the direction of movement of edges in the microimages relative to a direction of movement of the algorithm. At 804, if it is determined that edges in microimages of an area are moving relative to the microimage centers in the same direction as the direction of movement, the microimages in that area may be inverted relative to their individual centers. If the edges are not moving relative to the microimage centers in the same direction as the direction of movement (i.e., if the edges are moving in the opposite direction as the direction of movement), then the microimages in the area are not inverted.

In some embodiments, examination of the microimages to determine the direction of movement of edges may be performed manually by a user via a user interface. The user may mark or otherwise indicate areas that the user determines need be inverted via the user interface. In some embodiments, examination of the microimages to determine the direction of movement of edges may be performed automatically in software. In some embodiments, an automated software method may examine the microimages to determine noise in the microimages, for example using a Fourier transform to detect peaks at certain frequencies. An excessive amount of noise in an area of the final rendered image may indicate that microimages in that area are flipped, and thus need to be inverted. Microimages that include noise over a specified threshold may be marked to be inverted.

As indicated at 806, the microimages may each be cropped to produce an $m_1 \times m_2$ subregion or crop of each microimage, where at least one of $m_1$ and $m_2$ is an integer greater than two. As indicated at 808, the subregions or crops from the microimages may be appropriately assembled to produce a final high-resolution image of the scene.

In some embodiments, instead of cropping the microimages and assembling the subregions generated by the cropping, the microimages themselves may be appropriately assembled to produce a final high-resolution image of the scene. Thus, in some embodiments, element 806 is not performed; at 808, the microimages are assembled to produce an output image. In assembling the microimages, overlapping portions of adjacent microimages may be merged, blended, or otherwise handled.

In some embodiments, two or more images rendered from a flat according to rendering methods described herein may be combined to produce a higher-quality output image. For example, in some embodiments, the microimages in a flat may all be inverted, and the inverted microimages appropriately assembled to produce a first intermediate image. A second intermediate image may be generated without inverting the microimages prior to assembling. The two intermediate images may then be combined to produce a higher-quality output image. The combination of the two images may be performed manually by a user via a user interface, for example using a selection tool to select portions of an image to be combined with the other image, or alternatively may be performed automatically in software, for example using a noise detection technique as described above to find excessively noisy regions of one or both intermediate images. As an example, when combining the images, the user may manually (or software may automatically) select areas in one intermediate image that are of higher quality than the same areas in the other image, and then combine the selected areas with the other image to produce an output image that includes the highest quality portions of the two intermediate images. In some embodiments, a map (e.g., a bitmap) may be generated that indicates areas of each image that are to be included in the output image, and then the output image may be generated from the two intermediate images according to the map. In some embodiments, more than two intermediate images may be generated, and a similar method may be used to generate a higher-quality output image from the intermediate images.

Figure 25:
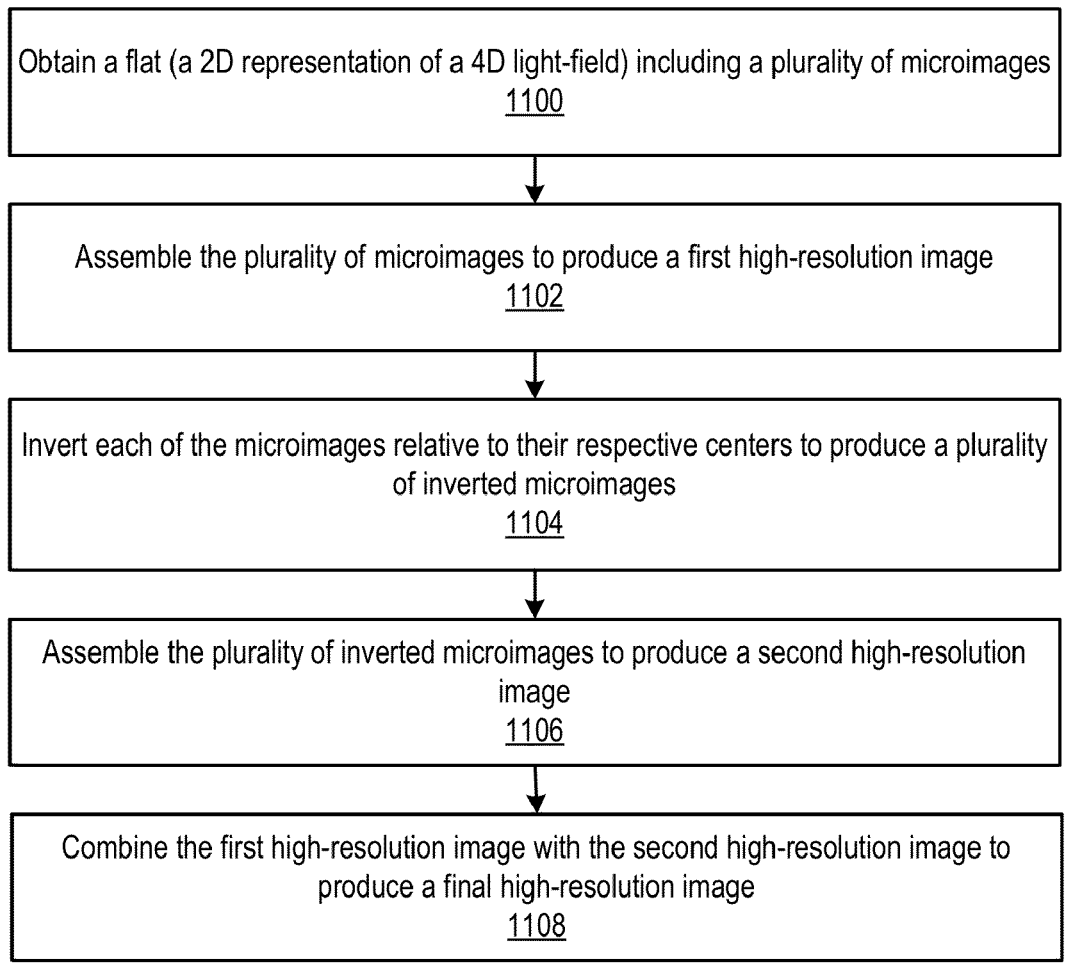
FIG. 25 is a flowchart of a full-resolution light-field rendering method in which multiple images are rendered from a flat and combined to produce a final high-resolution output image, according to some embodiments.

FIG. 25 is a flowchart of a full-resolution light-field rendering method in which multiple images are rendered from a flat and combined to produce a final high-resolution output image, according to some embodiments. As indicated at 1100, a flat captured by a focused plenoptic camera may be obtained (see, e.g., FIG. 9 for an example of what such a flat may look like to a human observer). As indicated at 1102, the plurality of microimages may be assembled to produce a first high-resolution image. As indicated at 1104, each of the microimages may be inverted relative to their respective centers to produce a plurality of inverted microimages. As indicated at 1106, the plurality of inverted microimages may be assembled to produce a second high-resolution image. As indicated at 1108, the first high-resolution image may be combined with the second high-resolution image to produce a final high-resolution image. The combination of the two images may be performed manually by a user via a user interface, for example using a selection tool to select portions of an image to be combined with the other image, or alternatively may be performed automatically in software, for example using a noise detection technique as described above to find excessively noisy regions of one or both intermediate images.

Figure 26:
FIG. 26 shows an example full-resolution rendering of a light-field in which foreground and background portions of the images shown in FIGS. 19 and 20 have been combined, according to one embodiment of the full-resolution light-field rendering method.

FIG. 26 shows an example full-resolution rendering of a light-field in which foreground and background portions of the example images shown in FIGS. 19 and 20 have been combined to produce a higher-quality output image. In FIG. 26, the foreground portion (the tree) of FIG. 19 has been replaced with the corresponding foreground portion of FIG. 19.

In some embodiments, multiple images may be rendered from a flat according to rendering methods described herein, using different values for $m_1$ and/or $m_2$ to crop the microimages before assembling the crops. This may produce multiple images with different visual quality. For example, assuming a square crop is to be made (i.e., $m_1=m_2$), some embodiments may be configured to perform the rendering using values for $m_1$ and $m_2$ in a specified range, for example from 5 to 10 inclusive to produce 6 output images, from 5 to 20 to produce 16 output images, and so on. One or more images may then be selected from among the multiple rendered images according to the quality of the images as output image(s). The selection may be performed manually, for example by a user via a user interface, or alternatively may be performed automatically in software, for example using a noise detection technique as described above to select images with lower levels of noise in one or more frequencies. Alternatively, two or more of the images may be selected and combined to generate a higher-quality output image. The combination of the images may be performed manually or automatically.

In some embodiments, inversion and cropping of microimages may be combined in a single automatic operation. For example, in some embodiments, a software module or modules configured to perform both inversion and cropping of microimages in a flat or in a specified area of a flat may have $(m_1, m_2)$ as input parameters (or, alternatively, an input parameter m if the crop is to be a square and thus $m_1=m_2$). A negative value for $(m_1, m_2)$ may be used to indicate that the microimages in the input flat or area are to be inverted, with a positive value for $(m_1, m_2)$ indicating that the microimages are not to be inverted. Other methods to indicate whether microimages are to be inverted may be used.

In some embodiments, inversion and cropping of microimages may be performed in various combinations on an input flat to render multiple rendered images according to the combinations. For example, in one embodiment, some images may be rendered using a range of values for $m_1$ and $m_2$ as described above while also inverting the microimages, while other images may be rendered using a range of values for $m_1$ and $m_2$ as described above in which the microimages are not inverted. One or more of the rendered images may then be manually or automatically selected as output image(s). Alternatively, two or more of the rendered images may be combined as previously described (see, e.g., FIG. 26) to produce an output image.

Focused Plenoptic Cameras Employing Microlenses with Different Focal Lengths

Various embodiments of methods and apparatus for capturing and rendering images with focused plenoptic cameras employing microlenses with different focal lengths are described. In embodiments of a focused plenoptic camera employing microlenses with different focal lengths, all of the microimages are captured at the same time in a single image (referred to as a flat) at the sensor. The microlenses with different focal lengths focus on different planes within the image created by the main lens of the camera, and project microimages from these different planes onto the photosensor. Thus, multiple microimages of the same scene may be captured at different focal lengths in a single flat at the same time with a focused plenoptic camera. Different ones of the microimages captured at different focal lengths are in focus at different planes of the image created by the main lens of the camera. Flats captured using embodiments of a focused plenoptic camera with microlenses of different focal lengths may be used to generate multiple images each captured at a different focal length. The different views of the scene captured by the different microlenses are identical or nearly identical 3D views of the scene, that is identical or nearly identical images all captured at the same time, but captured at different focal lengths. Imaging functions, such as focus bracketing and refocusing, may be performed on the flat to produce precise and high quality output images.

In a focused plenoptic camera as illustrated in FIGS. 6, 7, and 8, the main camera lens creates an image "in the air" at the focal plane. This may be referred to as the main image. This image is observed by an array of microlenses that are focused on the main image (and not on the main lens). Based on the multiple microlenses (which may be viewed as multiple microcameras), each point in the main image is re-imaged two or more times on to the sensor, and thus each point in the main image is captured in two or more of the microimages at the sensor. This is true for both the Keplerian telescopic mode and the Galilean telescopic (or binocular) mode of a focused plenoptic camera.

Figures 27A, 27B:
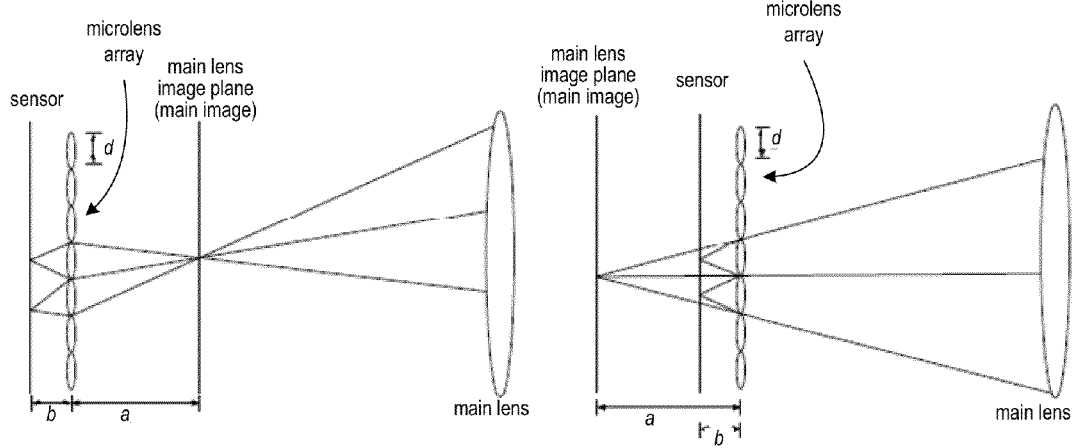
FIGS. 27A and 27B illustrate the different modes or configurations of a focused plenoptic camera according to some embodiments.

FIGS. 27A and 27B illustrate the different modes or configurations of a focused plenoptic camera according to some embodiments. FIG. 27A illustrates the Keplerian telescopic mode, and FIG. 27B illustrates the Galilean telescopic, or binocular, mode. Referring to FIG. 27A, in the Keplerian telescopic mode, the main image is real and is in front of the sensor. Referring to FIG. 27B, in Galilean telescopic mode, the main image is virtual, and is behind the sensor. In both modes, the main image is re-imaged to the sensor multiple times. The unobstructed diameters of the microlenses are the same, denoted as d. The distances a and b and the focal length of the microlenses satisfy the lens equation. Note that, in Galilean mode, a is negative.

Embodiments of the focused plenoptic camera capture an array of microimages. Each microimage is captured with large, ideally infinite, depth of field. Each point is imaged multiple times by different microlenses. As shown in FIGS. 27A and 27B, the microlenses are focused on one fixed plane. This plane satisfies the lens equation $1/a+1/b=1/f$. Due to the small apertures of the microlenses, if used to create images of only a few pixels across, the microlenses have extended depth of field, focused almost everywhere. Rendering techniques, such as those shown in FIGS. 22 and 25, may thus be applied to the microimages in a captured flat to generate an in-focus image.

Conventional plenoptic cameras provide the capability to focus and refocus images from a single flat after the flat is captured. However, conventional plenoptic cameras require extremely high pixel size of the captured image in order to create quality refocused images. In this respect, embodiments of the focused plenoptic camera as previously described are more efficient than conventional plenoptic cameras. However, artifacts may still be observed with large changes in focus if the input data is insufficient.

Embodiments of focused plenoptic cameras employing microlenses with different focal lengths are described that may leverage the characteristics of the focused plenoptic camera as described herein to produce quality output images that are in-focus at different depths. Considering the fact that the focused plenoptic camera simultaneously captures multiple, almost identical, microimages, embodiments of a focused plenoptic camera that include microlenses with at least two different focal lengths may be used to simultaneously capture microimages from at least two different focal planes created by the main camera lens at different distances from the microlens array. For example, in some embodiments, a focused plenoptic camera that includes microlenses with two different focal lengths may capture some of the microimages from one focal plane at a distance a from the microlens array, and capture others of the microimages from another focal plane at a different distance a' from the microlens array. A focused plenoptic camera that includes microlenses with n different focal lengths may be considered as essentially the equivalent of n focused plenoptic cameras in one. Each of these n "cameras" has an amount of 3D capability, but each "camera" is focused at a different depth. Image operations such as refocusing and focus bracketing are thus made possible from such "multiple camera" data. Since all of the microimages in a flat are captured by the focused plenoptic camera at the same time, there is no problem with changing scenes in the field of view as there is when using conventional cameras to perform focus bracketing by capturing a sequence of temporally different images.

From a flat captured with a focused plenoptic camera including microlenses of n different focal lengths, images may be constructed from subsets of the microimages captured using each type of microlens, thus creating n images each focused at a different depth. An advantage of this approach when compared to a focused plenoptic camera with microlenses all of the same focal length and with infinite depth of field in each microlens is that larger apertures may be used, and thus a lower F-number may be used. This results in a faster camera (capturing more of the light), which generally results in better quality images. In addition, focusing is performed optically and not digitally, thus requiring less data to be saved and less data processing to be performed.

In embodiments, different optical elements that provide two or more different focal lengths may be used in a focused plenoptic camera such as camera 200 illustrated in FIGS. 6 and 7 and camera 400 illustrated in FIG. 8. For example, an alternating pattern (or some other pattern) of microlenses of two or more different focal lengths may be provided in a microlens array. A raw image or "flat" captured using the microlens array includes multiple microimages captured at the different focal lengths according to the two or more different microlenses of different focal lengths. One or more different images may then be assembled from the microimages, with each image assembled from microimages captured using the microlenses of one of the different focal lengths. Each of these images "captures" the scene in front of the camera at a different focal plane. If desired, a final image may then be generated by appropriately combining two or more of the images assembled from the microimages, for example by combining in-focus regions of one image with in-focus regions of another object. Alternatively, images may be assembled from the microimages by first combining the microimages and then assembling the combined microimages to produce one or more output images. Example methods for assembling microimages from a flat captured by a focused plenoptic camera to generate an image or images are shown in FIGS. 22 and 25.

In embodiments of a focused plenoptic camera employing microlenses with different focal lengths, a single image or "flat" may be captured using the camera. The flat consists of multiple microimages, each corresponding to a microlens in the microlens array. From this single flat, two or more different images may be generated by appropriately assembling the microimages. The two or more images exhibit different focusing characteristics according to the respective microlenses that captured the microimages from which the images are assembled. This allows, for example, a single flat to be captured of an action scene, such as a sporting event or wildlife; from that flat, multiple images captured at different focal lengths and thus exhibiting different focusing characteristics may be generated. This, for example, allows a photographer to take a single "snapshot" of an action scene, and from that single image (the flat), produce two or more images of the same scene. Since the images were all captured at the same time in a single flat, the images are essentially identical except that each is focused differently. The photographer may then select a best-focused image from among the different images. Alternatively, using appropriate image processing tools, the photographer may choose to assemble a composite image from the multiple images that incorporates different regions from different images that are in-focus.

In some embodiments, as an alternative to the described method in which multiple images are assembled directly from the flat, the microimages from a raw flat captured with a focused plenoptic camera employing microlenses with different focal lengths may first be combined to generate a combined flat (a flat including the combined microimages). The microimages from the combined flat may then be appropriately assembled to produce one or more output images. Combining the microimages to generate a combined flat may allow the combined flat to be used in generating 3D views, parallax generation, and in general in any of various lightfield operations that may be performed on a flat captured with a focused plenoptic camera.

Various embodiments of a focused plenoptic camera that employ different optical elements to provide the n different focal lengths are described. Embodiments are described in which an array of single microlenses including at least two different microlenses with different focal lengths are employed; in these embodiments, each single lens may be considered an optical element. Embodiments are also described in which an array of stacks of two (or potentially more) microlenses including at least two different stacks that provide different focal lengths are employed; in these embodiments, each stack of two (or more) microlenses may in combination be considered as a single optical element. In some embodiments that employ stacks of lenses, the lens stacks may be provided by stacking two microlenses arrays, for example microlens arrays manufactured on silica wafers as described later in this document, on top of each other in the camera. In some embodiments that employ two microlens arrays, one of the two microlens arrays includes microlenses all of the same focal length, while the other microlens array includes at least two different microlenses of different focal lengths. In this second array, the different microlenses may also provide different depths of field.

Embodiments Using an Array of Single Microlenses as Optical Elements

Figure 28:
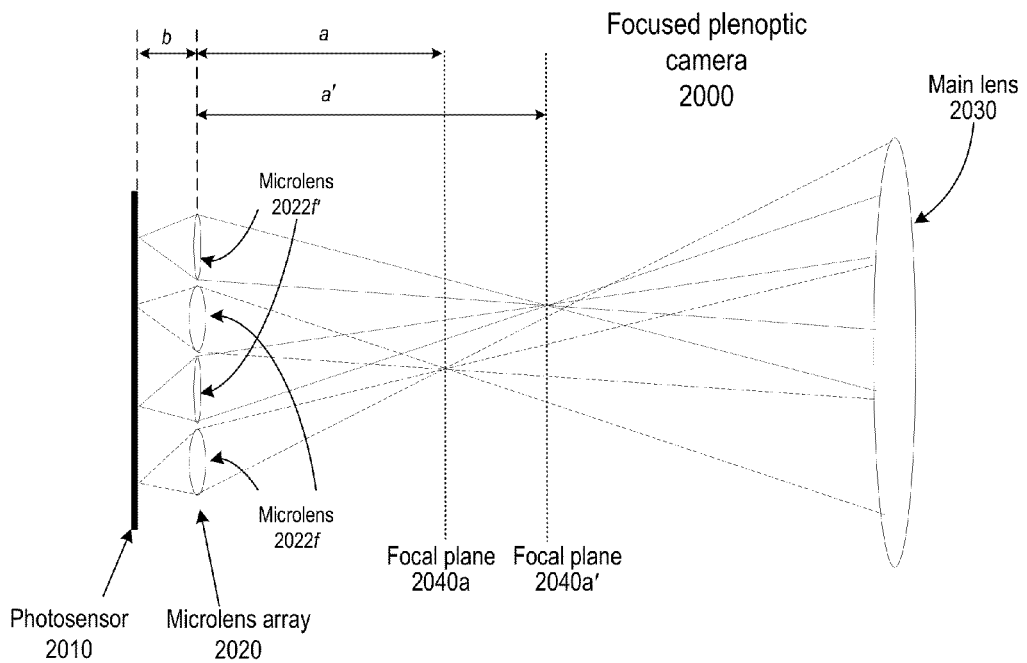
FIG. 28 is a block diagram illustrating a focused plenoptic camera including different microlenses with different focal lengths and depths of focus, according to some embodiments.

FIG. 28 is a block diagram illustrating a focused plenoptic camera, for example as illustrated in FIG. 6, including different microlenses with different focal lengths and depths of focus, according to some embodiments. Note that, in FIG. 28, as in the other Figures, the distances between elements, the sizes of the elements, and the relative sizes of the elements when compared to each other are illustrative and are not intended to be limiting. Focused plenoptic camera 2000 may include a main (objective) lens 2030, a microlens array 2020, and a photosensor 2010. In some embodiments, photosensor 2010 may be conventional film; in other embodiments, photosensor 2010 may be a device for digitally capturing light, for example a CCD.

In this example, the microlens array 2020 includes microlenses 2022 of two different focal lengths, designated by f and f'. Microlenses 2022f have a shorter focal length f than microlenses 2022f' with focal length f'. Microlenses 2022f are focused on focal plane 2040a of the main lens 2030; focal plane 2040a is at distance a from the microlens array 2020. Microlenses 2022f' are focused on focal plane 2040a' of the main lens 2030; focal plane 2040a' is at distance a' from the microlens array 2020.

Figure 29:
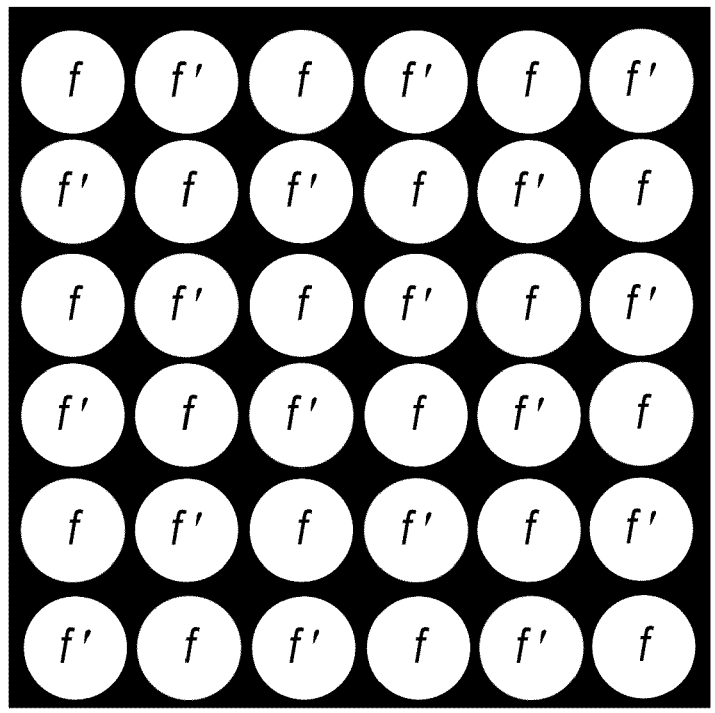
FIG. 29 illustrates a portion of a microlens array including and alternating pattern of microlenses of two different focal lengths, according to some embodiments.

FIG. 29 illustrates a portion of a microlens array including and alternating pattern of microlenses of two different focal lengths f and f', according to some embodiments. The microlens array may be manufactured as a wafer, for example a glass or fused silica wafer, with the microlenses integrated into or deposited onto the wafer. FIG. 16 shows a zoom into an actual image of an example microlens array, and shows individual microlenses and (black) chromium mask between the microlenses. Referring to FIG. 29, the white circles represent microlenses in the array. Each microlens may have a diameter of, for example, 240 microns. The distance between the centers (the optical axes) of the microlenses (referred to as the pitch) may be, for example, 250 microns. Other diameters and/or pitches may be used in various embodiments. While FIG. 29 shows the microlenses arranged in a regular grid pattern, other patterns or arrangements of microlenses may be used in various embodiments. Also, while FIG. 29 shows the microlenses as all the same diameter, microlenses of different focal lengths may have different diameters.

To create the microlenses with different focal lengths in the microlens array, one or more of microlens diameter, microlens thickness, and microlens material may be varied. Various manufacturing techniques may be employed to create microlenses with different focal lengths in an array, for example on a silica wafer.

The black region of FIG. 29 represents a mask or masking on the microlens array to prevent light passing through the microlens array except through the microlenses. To create the mask, for example, on one side of the wafer (e.g., the back side of the wafer, with the microlens curvature on the front side), the appropriate masked region may be coated with an opaque material or substance, such as black chromium. Alternatively, the mask may be deposited on one wafer, while the microlenses are manufactured on another wafer; the two wafers may then be combined to create the microlens array. Other methods of manufacturing a microlens array and/or of applying a mask to a microlens array may be used. In some embodiments, such as the examples shown in FIGS. 29 and 30, the mask is deposited so that all of the microlenses, including the microlenses of different focal lengths, have the same aperture to within the precision of the manufacturing process.

Figure 30:
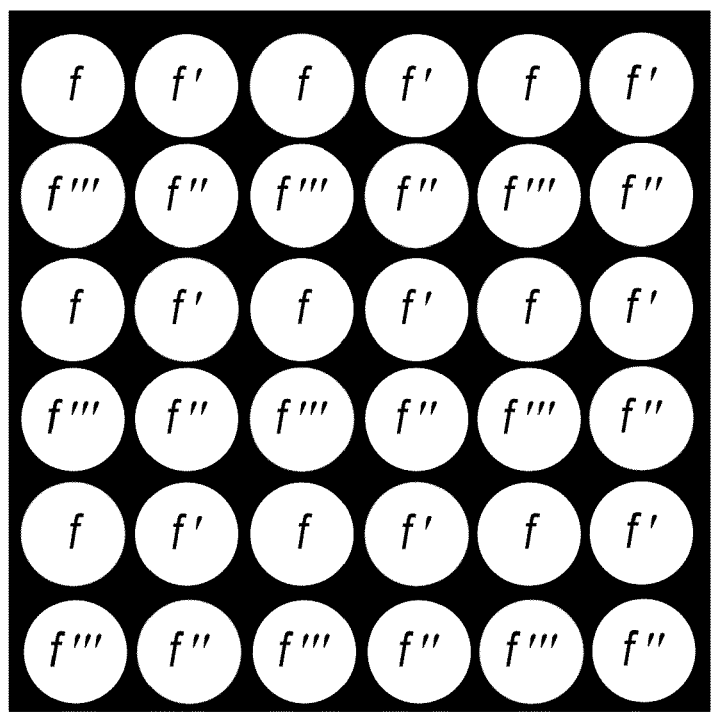
FIG. 30 shows a portion of an example microlens array including an alternating pattern of microlenses of four different focal lengths, according to some embodiments.

While FIGS. 28 and 29 show microlenses of two different focal lengths in a microlens array, embodiments may include microlenses of n different focal lengths producing n different planes of focus, or focal planes. FIG. 30 shows an example microlens array including an alternating pattern of microlenses of four different focal lengths (f, f', f", and f'''), according to some embodiments, which would produce four different focal planes.

Each of the n focal planes (e.g., focal planes 2040a and 2040a' of FIG. 28, or the four focal planes produced by the microlens array shown in FIG. 30) satisfies the general lens equation (1/a+1/b=1/f) with a different f. In general, the parameters a, b, and f may vary. However, in some embodiments, the parameter b is fixed. For example, referring to FIG. 28, the lens equation would be satisfied by:

$$1/a + 1/b = 1/f$$

$$1/a' + 1/b = 1/f'$$

A minification metric M may be defined as:

$$M = \frac{a}{b}$$

where a is the distance from the focal plane of the microlenses and b is the distance from the microlenses to the sensor. M specifies how many times the main image in front of the microlenses is reduced when mapped to the sensor. Since the microlenses in the microlens array are at the same pitch (the distance between the optical axes), and each point in the main image should be imaged at least once by each type of microlens, for the microlens arrangement of FIGS. 28 and 29 with two different focal lengths, M should be greater than 2 (M>2). Generalizing, M>n for a one-dimensional camera (i.e., a row of different microlenses in a microlens array), where n is the number of different cameras in the row. Note that the same applies to a column.

From the lens equation and definition of M, the following (equation 1) may be computed:

$$a = \frac{bf}{(b-f)} \text{ and } M = \frac{1}{(b/f - 1)} \quad (1)$$

From the above, the parameters f and b of the microlens array define both M and the plane of best focus, a.

From a flat captured with a focused plenoptic camera including microlenses of n different focal lengths, images may be constructed from subsets of the microimages captured using each type of microlens, thus creating n images each focused at a different depth. One or more image processing techniques may be applied to two or more of these n images to produce a combined image that incorporates in-focus regions of the two or more images.

Embodiments Using an Array of Microlens Stacks as Optical Elements

FIG. 28 illustrates embodiments of a focused plenoptic camera with a microlens array including different microlenses with different focal lengths. These embodiments employ an array that provides a pattern of single microlenses with different focal lengths. Embodiments of a focused plenoptic camera that employ stacks of two or more microlenses in a microlens array, or alternatively two or more microlenses arrays that when combined provide the microlens stacks, are described. In these embodiments, stacks of two or more microlenses may be used in an array of optical elements (considering the two or more microlenses in a stack as one optical element) that provide different focal lengths and depths of field.

Figure 31:
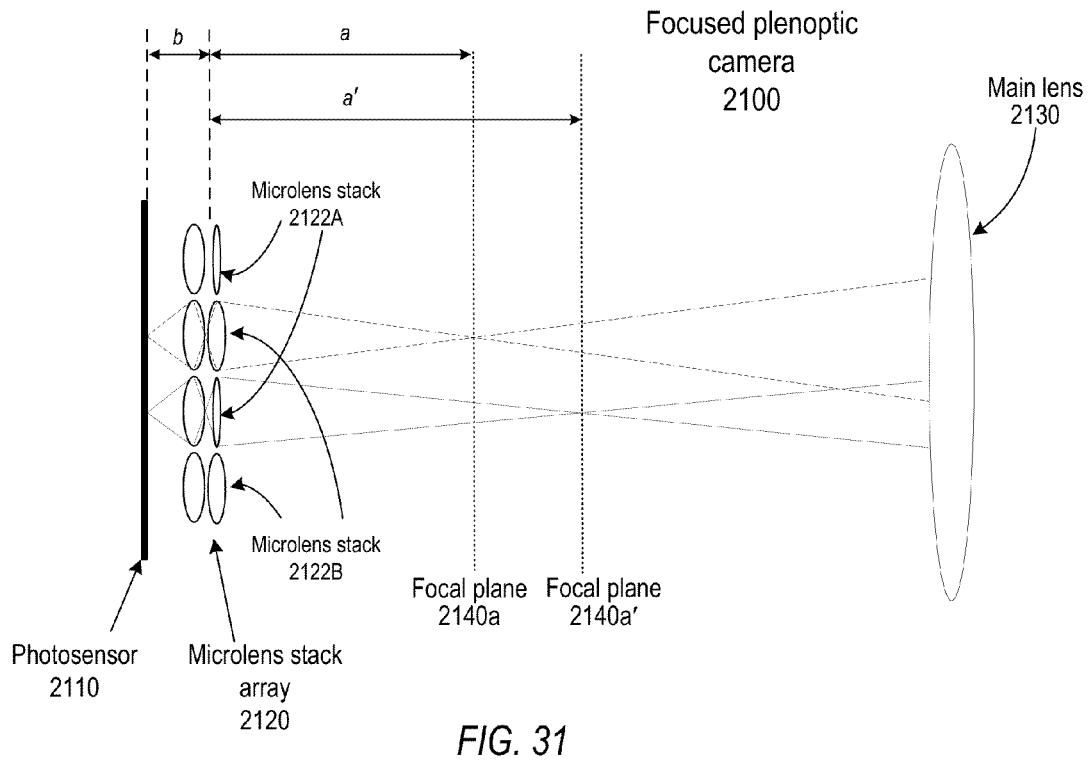
FIG. 31 is a block diagram illustrating a focused plenoptic camera including stacks of two or more microlenses in a microlens array with different focal lengths provided by different microlens stacks, according to some embodiments.

FIG. 31 is a block diagram illustrating a focused plenoptic camera, for example as illustrated in FIG. 6, including stacks of two or more microlenses in a microlens array with different focal lengths provided by different microlens stacks, according to some embodiments. Note that, in FIG. 31, the distances between elements the sizes of the elements, and the relative sizes of the elements when compared to each other are illustrative and are not intended to be limiting. Focused plenoptic camera 2100 may include a main (objective) lens 2130, an array 2120 of microlens stacks, and a photosensor 2110. In some embodiments, photosensor 2110 may be conventional film; in other embodiments, photosensor 2110 may be a device for digitally capturing light, for example a CCD.

In this example, array 2120 includes microlens stacks 2122 that provide two different focal lengths, which may be designated by $\Phi$ and $\Phi'$. Microlens stack 2122A provides a shorter focal length $\Phi$ than microlens stack 2122B, which provides focal length $\Phi'$. Microlens stacks 2122A are focused on focal plane 2140a of the main lens 2130; focal plane 2140a is at distance a from the microlens array 2120. Microlens stacks 2122B are focused on focal plane 2140a' of the main lens 2130; focal plane 2140a' is at distance a' from the microlens array 2120. In some embodiments, as shown in FIG. 31, the microlenses on the sensor side of the microlens stacks may all be identical, while the microlenses on the main lens side of the microlens stacks may differ to provide the different focal lengths. Other arrangements of microlenses in the stacks are possible.

Figure 32:
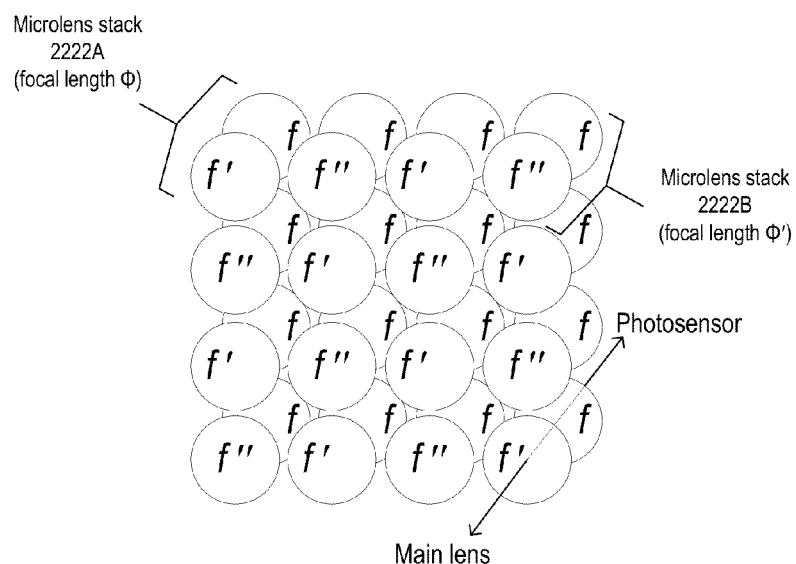
FIG. 32 illustrates a portion of an example array including an alternating pattern of microlens stacks that provide different focal lengths, according to some embodiments.

FIG. 32 illustrates a portion of an example array including an alternating pattern of microlens stacks that provide different focal lengths $\Phi$ and $\Phi'$, according to some embodiments. The white circles represent microlenses in the microlens stacks. The array of microlens stacks may be viewed as two separate arrays of microlenses, with one of the two arrays closer to the photosensor, and the other array closer to the main lens. In this example, the microlenses in the array closer to the sensor all have a focal length of f. The microlenses in the array closer to the main lens have alternating focal lengths of f' and f". Note that embodiments in which both arrays include microlenses with different focal lengths are possible. Stack 2222A includes a microlens with a focal lengths of f'; the microlenses in stack 2222A act together to produce a focal length of $\Phi$. Stack 2222B includes a microlens with a focal lengths of f"; the microlenses in stack 2222B act together to produce a focal length of $\Phi'$. While FIG. 32 shows the microlens stacks arranged in a regular grid pattern, other patterns or arrangements of microlens stacks may be used in various embodiments.

In some embodiments, an array of microlens stacks may be formed by combining two separate microlens arrays. For example, one microlens array that includes microlenses all of the same focal length may be combined with another microlens array that includes microlenses of n different focal lengths, with the microlenses in the arrays aligned on their optical axes, to form an array of microlens stacks. FIG. 33 illustrates portions of two example microlens arrays that may be combined to form an array of microlens stacks, according to some embodiments. Microlens array 2300 includes an alternating pattern of microlenses of two different focal lengths f' and f". Microlens array 2310 includes a pattern of microlenses of focal length f. The microlens arrays may be manufactured as wafers, for example as glass or fused silica wafers, with the microlenses integrated into or deposited onto the wafer. FIG. 16 shows a zoom into an actual image of an example microlens array, and shows individual microlenses and (black) chromium mask between the microlenses. Referring to FIG. 33, the white circles represent microlenses in the array. Each microlens may have a diameter of, for example, 240 microns. The distance between the centers (the optical axes) of the microlenses (referred to as the pitch) may be, for example, 250 microns. Note that both microlens arrays have the same pitch. Other diameters and/or pitches may be used in various embodiments. While FIG. 33 shows the microlenses arranged in the microlens arrays in a regular grid pattern, other patterns or arrangements of microlenses may be used in various embodiments. Note that the centers of the microlenses in array 2300 are aligned with the centers of the microlenses in array 2310.

To create the microlenses with different focal lengths in microlens array 2300, one or more of microlens diameter, microlens thickness, and microlens material may be varied. For example, in one manufacturing method, microlenses may be created by depositing an array of very small droplets of an appropriate material on a silica wafer, and then evenly heating the wafer to cause the droplets to spread. If the same amount of material is used in each droplet, then all of the resulting microlenses will be of the same diameter and thus of the same focal length, to within the precision of the manufacturing process. By depositing different amounts of material in different droplets, the resulting microlenses will be of different diameters and thus of different focal lengths.

The black region of the microlens arrays shown in FIG. 33 represents masking on the microlens arrays to prevent light passing through the microlens arrays except through the microlenses. To create the mask, for example, on one side of a wafer (e.g., the back side of the wafer, with the microlens curvature on the front side), the appropriate masked region may be coated with an opaque material or substance, such as black chromium. Alternatively, the mask may be deposited on one wafer, while the microlenses are manufactured on another wafer; the two wafers may then be combined to create the microlens array. Other methods of manufacturing a microlens array and/or of applying a mask to a microlens array may be used. In some embodiments, such as the examples shown in FIG. 33, the mask is deposited so that all of the microlenses, including the microlenses of different focal lengths, have the same aperture to within the precision of the manufacturing process.

While FIG. 33 show microlenses of two different focal lengths in microlens array 2300, embodiments may include microlenses of n different focal lengths producing n different planes of focus, or focal planes. FIG. 30 shows an example microlens array including an alternating pattern of microlenses of four different focal lengths (f, f', f", and f'"), according to some embodiments, which would produce four different focal planes; a similar microlens array could be used in combination with a microlens array such as array 2310 to produce an array of microlens stacks.

When manufacturing a microlens array, such as an array of microlenses deposited on a silica wafer as described above, generally, the microlenses are formed on one side of the wafer. Thus, one side of a microlens array will generally be flat, with the other side including the microlenses. When combining two microlens arrays, such as arrays 2300 and 2310 shown in FIG. 33, the microlens arrays may be placed with the microlenses facing each other, with one array's microlenses facing the other array's flat side, or with both flat sides facing each other. While all these arrangements are possible, an arrangement with the microlenses facing each other, as shown in FIG. 34A, and an arrangement where the microlenses in the microlens array with microlenses of different focal lengths are facing the flat side of the microlens array including microlenses all of the same focal length, as shown in FIG. 34B, are discussed below.

FIG. 34A shows two example microlens arrays with the microlenses facing each other, according to some embodiments. FIG. 34A shows a cross-section of a row of four microlenses in each of two microlens arrays 2300 and 2310 that have been combined with the microlenses facing each other. In this arrangement, there may essentially be zero distance between the arrays of lenses. The distance between two stacked microlenses in this arrangement may thus be assumed to be zero. Array 2310 has identical microlenses with a small focal length f, and may be placed at distance b=f from the photosensor. Array 2300 may have two or more types of longer focal length microlenses that are used as corrections to the focal length of the microlenses in array 2310. In this example, microlenses of two focal lengths, f' and f", are shown. The following analysis is performed using the microlens with focal length f'.

The combined focal length of two lenses, f and f', placed on top of each other as shown in FIG. 34A may be given by:

$$\Phi = \frac{ff'}{(f+f')}$$

Using equation (1):

$$a = \frac{f\Phi}{(f-\Phi)} = f' \qquad (2)$$

and:

$$M = \frac{1}{\frac{f}{\Phi} - 1} = \frac{f'}{f} \qquad (3)$$

Figure 35:
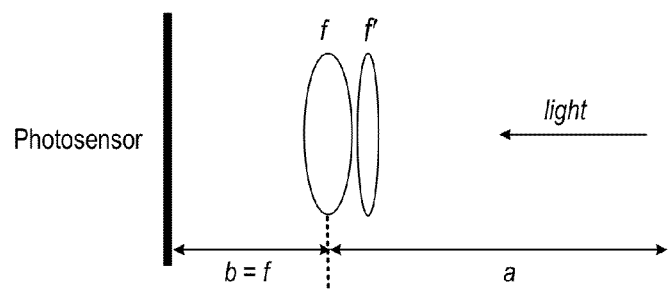
FIG. 35 is an optical representation of the arrangement shown in FIG. 34A.

FIG. 35 graphically illustrates the above. In FIG. 35, lenses, f and f', are assumed to be placed at the same location. Note that the focal length f' of the long-focus lens is exactly equal to the distance from the lens plane to the plane of best focus, and that minification (M) is $$\frac{f'}{f}.$$

FIGS. 34A and 35 illustrate the case where the microlenses are placed next to each other, and thus the distance between the stacked microlenses may be assumed to be zero. FIG. 34B illustrates an arrangement in which the microlenses in the microlens array with microlenses of different focal lengths are facing the flat side of the microlens array including microlenses all of the same focal length, according to some embodiments. FIG. 34B shows a cross-section of a row of four microlenses in each of two microlens arrays 2300 and 2310 that have been combined with the microlenses of array 2300 facing the flat side of array 2310. Thus there is some finite, non-zero distance between the stacked microlenses. Array 2310 has identical microlenses with a small focal length f, and may be placed at distance b=f from the photosensor. Array 2300 may have two or more types of longer focal length microlenses that are used as corrections to the focal length of the microlenses in array 2310. In this example, microlenses of two focal lengths, f' and f", are shown.

The arrangement shown in FIG. 34B is a more complex case than that shown in FIG. 34A. The microlenses in array 2310, which have a short focal length, may need to be positioned close to the photosensor. Because the wafer may be relatively thick (for example 1 mm), and the focal length of the microlenses in the main microlens array (array 2310) is relatively short, the main microlens array (array 2310) may be positioned so that the microlenses are facing the photosensor. The longer focal length microlenses of the second array (array 2300) are positioned next to the flat side of array 2310, and thus are at a finite but non-zero distance D from the shorter focal length microlenses of array 2310 due to the wafer thickness. This distance D needs to be accounted for in the calculations.

Figure 36:
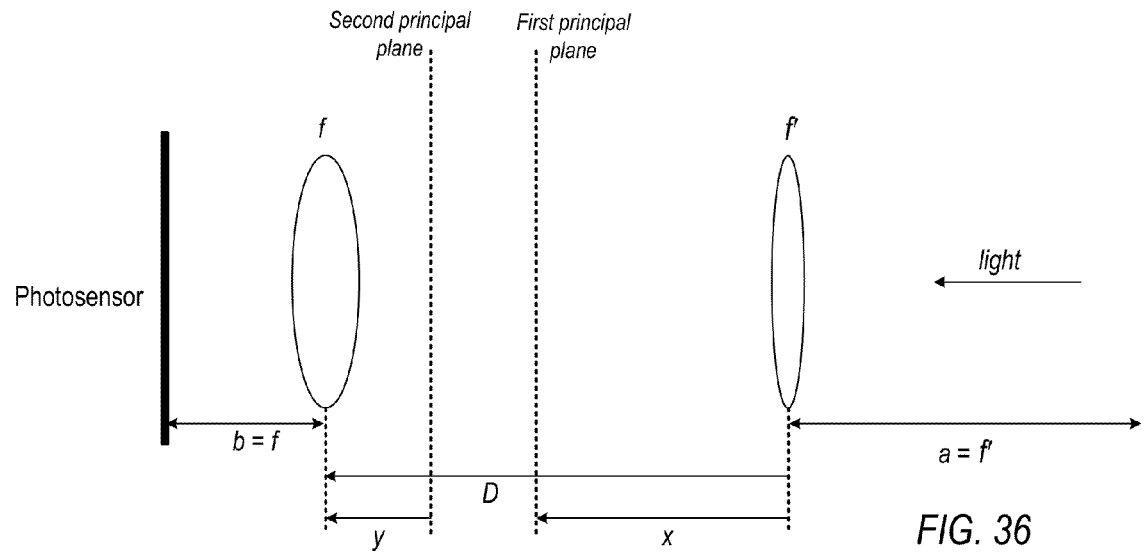
FIG. 36 is an optical representation of the arrangement shown in FIG. 34B.

The following analysis is performed assuming the microlenses with focal length f'. An optical representation of the arrangement shown in FIG. 34B is illustrated in FIG. 36. Light comes from the right, and is refracted by the first lens with focal length f', then travels a distance D to the second lens with focal length f, and then travels to the photosensor. Note that focal length f' is a longer focal length than f.

In Optics, travel is represented by the following matrix:

$$T(t) = \begin{bmatrix} 1 & t \\ 0 & 1 \end{bmatrix}$$

and lens refraction is described by:

$$L(f) = \begin{bmatrix} 1 & 0 \\ -\frac{1}{f} & 1 \end{bmatrix}$$

From the above, the total optical transfer matrix of a system consisting of two lenses and distance D between the lenses, for example as illustrated in FIGS. 34B and 36, is:

$$L(f)T(D)L(f') = \begin{bmatrix} 1 - \frac{D}{f'} & D \\ \frac{D}{ff'} - \frac{1}{f} - \frac{1}{f'} & 1 - \frac{D}{f} \end{bmatrix} \quad (4)$$

The process may be represented in terms of principal planes, i.e. an imaginary system that is equivalent to the above but consists of two travels, x and y as shown in FIG. 36, and one lens:

$$T(y)L(\Phi)T(x) = \begin{bmatrix} 1 - \frac{y}{\Phi} & x+y - \frac{xy}{\Phi} \\ -\frac{1}{\Phi} & 1 - \frac{x}{\Phi} \end{bmatrix} \quad (5)$$

Expressions (4) and (5) should be equal; that is, the systems are identical optically. This results in the following:

$$\Phi = \frac{f'f}{f' + f - D} \quad (6)$$

$$x = \frac{Df'}{f + f' - D} \quad (7)$$

$$y = \frac{Df}{f + f' - D} \quad (8)$$

Next, the left microlens is placed at distance b=f from the photosensor. The location of the effective lens is at distance f+y, where y is given by equation (8). The focal length of the effective lens is given by equation (6). The plane that is in focus satisfies the lens equation:

$$\frac{1}{a+x} + \frac{1}{f+y} = \frac{1}{\Phi}$$

where a is the distance from the rightmost lens to that plane. Substituting from equations (6), (7) and (8):

$$a = f' \quad (9)$$

The minification for the system is given by:

$$M = \frac{(a+x)}{(f+y)}$$

Substituting from equations (6), (7) and (8) yields:

$$M = \frac{f'}{f} \quad (10)$$

Figure 37:
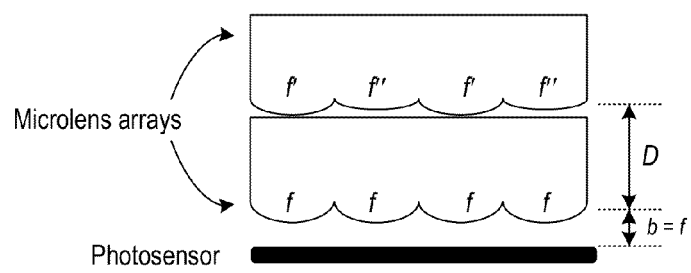
FIG. 37 shows the arrangement of FIG. 34B in which the main microlens array is positioned one focal lengths from the photosensor, according to some embodiments.

Equations (9) and (10) are exactly the same as equations (2) and (3). Thus, the distance D between the microlens arrays, for example as shown in FIG. 34B, does not influence the focusing properties if the microlens array that is closer to the photosensor (e.g., microlens array 2310 of FIG. 34B) is positioned one focal length from the photosensor, as shown in FIG. 37.

Depth of Field

The size of a pixel in a photosensor may be designated as p. The image-side F-number (designated by F#) is approximately:

$$F\# = \frac{(f+y)}{d}$$

where d is the microlens aperture. The image is in focus if it is formed within distance pF# from the photosensor. This distance is related to a distance DOF (depth of field) in object space:

$$DOF = M^2 pF\# \quad (11)$$

This is due to the fact that longitudinal magnification is quadratic relative to lateral magnification M. This may be proven by differentiating the lens equation at a fixed f.

Example Embodiment

Figure 38:
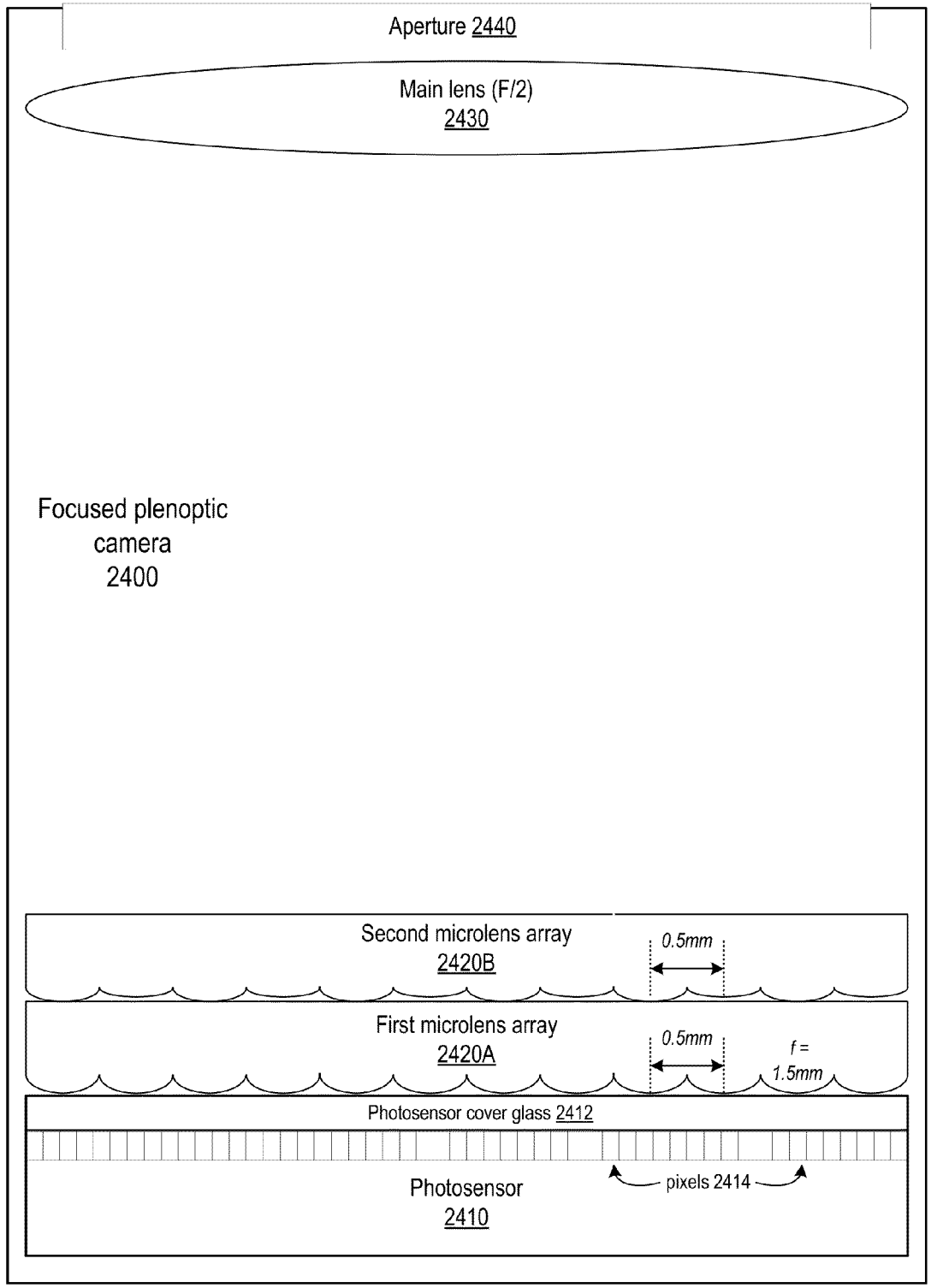
FIG. 38 is a block diagram illustrating an example embodiment of a focused plenoptic camera that includes an array of optical elements in which different ones of the optical elements provide different focal lengths.

FIG. 38 is a block diagram illustrating an example embodiment of a focused plenoptic camera that includes an array of optical elements in which different ones of the optical elements provide different focal lengths. This embodiment employs microlens stacks, each including two microlenses, formed by stacking two microlens arrays 2420 on top of each other, similar to the examples shown in FIGS. 33, 34B, and 37. Note that, in FIG. 38, as in the other Figures, the number of elements, the distances between elements, the sizes of the elements, and the relative sizes of the elements when compared to each other are illustrative and are not intended to be limiting. Furthermore, values for various dimensions, optical numbers (such as F-numbers), distances, and so on are given by way of example, and are not intended to be limiting.

In this example embodiment, the first microlens array 2420A is placed directly on the photosensor cover glass 2412 with the mircolenses facing the glass 2412. The focal length f of each of the microlenses in array 2420A is equal to the optical distance from the lens plane to the photosensor pixel surface. In one embodiment, as illustrated in FIG. 38, the pitch (the distance between microlens centers) is 0.5 mm, and the focal length of the microlenses in array 2420A is 1.5 mm. In one embodiment, a photosensor 2410 with pixels 2414 of pixel size 6.8 microns may be used. Other embodiments may use photosensors with different pixel sizes and/or different thicknesses of the glass 2412, and may use microlens arrays 2420A with other pitches and/or focal lengths. A configuration of photosensor 2410 and microlens array 2420A as or similar to that shown in FIG. 38 may work with a main lens of relatively low F-number, for example F/3. In the example embodiment shown in FIG. 38, the main lens has an F-number of F/2. However, the camera 2400 includes an aperture 2440 via which the F-number is limited to F/3. In some embodiments, a rectangular or square aperture may be used. Using a rectangular or square aperture may allow the array of microimages projected onto the photosensor 2410 by the microlens arrays to substantially fill the sensor space without empty black areas or gaps between the microimages.

Low F-numbers may require a smaller number of microlenses because the distance between microlens axes needs to be larger. In a conventional plenoptic camera such as camera 102 of FIGS. 3 and 4, the number of pixels in a final image is equal to the number of microlenses; thus, using fewer microlenses would result in lower-resolution output images. To address this issue, in many conventional plenoptic cameras, the photosensor cover glass is removed so that the microlenses can be placed closer to the sensor pixels. In embodiments of a focused plenoptic camera such as the example embodiment illustrated in FIG. 38, the cover glass of the photosensor does not need to be removed; the microlenses of the microlens array are placed against the cover glass, instead of placing the microlens array directly against the pixel surface after removing the glass as is done in many conventional plenoptic cameras. Thus, the photosensor remains protected by the cover glass. This allows users of the camera to install, remove, or replace microlens arrays in the camera with little or no risk of damaging the photosensor, which remains protected by the cover glass.

The microlenses in microlens array 2420A as illustrated in FIG. 38 may have circular apertures of up to 0.5 mm. In an example embodiment, the microlenses in microlens array 2420A may have circular apertures of 0.2 mm. Using an aperture of 0.2 mm, the effective F-number for focused plenoptic camera 2400 is approximately 1.5/0.2=7.5. The apertures of the microlenses may be provided by a mask applied to the microlens array. See, for example, FIG. 29 and the discussion thereof for a description of example methods of applying a mask to a microlens array.

In focused plenoptic camera 2400 of FIG. 38, the second microlens array 2420B is placed on top of microlens array 2420A, with the microlens centers in the two arrays aligned. See, for example, FIG. 33. Thus, the two microlens arrays, when combined, essentially form an array of optical elements, with each optical element including two stacked microlenses. The distance between the two microlens arrays is not critical; however, the distance should be short enough so that the apertures of the microlenses in array 2420B does not affect the optical characteristics of the camera.

The second microlens array 2420B may include n different microlenses that provide n different focal lengths, where n is an integer greater than or equal to two. FIG. 39 shows an example microlens array that may be used as the second microlens array 2420B and that includes four different microlenses with respective focal lengths fa, fb, fc, and fd arranged in a checkerboard pattern, according to some embodiments. Other numbers of focal lengths may be used, and/or other patterns and arrangements of the microlenses may be used. Also, while FIG. 39 shows the microlenses as all the same diameter, microlenses of different focal lengths may have different diameters.

In one embodiment of a microlens array such as the microlens array shown in FIG. 39, the four different microlenses may provide different focal lengths and depth of field (DOF) as shown in Table 1 below:

TABLE 1

| Focal Length | DOF |
|---|---|
| fa = 4 mm | 0.35 mm |
| fb = 5 mm | 0.55 mm |
| fc = 6 mm | 0.80 mm |
| fd = 8 mm | 1.40 mm |

Note that the depth of fields overlap, and at every depth at least one microlens images in focus. Table 1 is given as an example, and is not intended to be limiting. Other embodiments may include fewer or more than four different types of microlenses. Also, other embodiments may include microlenses of different focal lengths and/or depths of field in various combinations. In addition, microlenses of different focal lengths may be of different diameters and/or different thicknesses.

The range of depths that is sampled by the microlenses listed in Table 1 is approximately 5 mm. A main camera lens focal length needs to be chosen such that it forms the important part of the image within this range of depths. The values in Table 1 may be computed based on equations (9), (10), and (11) assuming an aperture of 0.2 mm. Larger apertures would give proportionally smaller depths of field, which would require less difference between fa, fb, fc, and fd.

Embodiments of a microlens array including n different microlenses that provide n different focal lengths may generally include a first type of microlens covering a certain range of depth, a second type of microlens covering an additional range of depth, and so on, without leaving gaps in the range covered. Leaving a gap or gaps in the range of depths covered may result in some objects of a scene being blurry at certain depths.

Flats Captured with Different Optical Elements Providing Different Focal Lengths The various embodiments of a focused plenoptic camera that employ different optical elements to provide n different focal lengths as described above each capture flats comprising multiple microimages, where each microimage corresponds to one of the optical elements in the array of optical elements (whether a single microlens or a stack of microlenses). See FIG. 9 for an example of what such a flat may look like to a human observer. Each type of optical element captures microimages from a particular focal plane of the main lens that corresponds to the focal length of the optical element. From a flat captured with a focused plenoptic camera including optical elements that provide n different focal lengths, images may be constructed from subsets of the microimages captured using each type of optical element, thus creating n images each focused at a different depth. Rendering techniques, such as those shown in FIGS. 22 and 25, may be applied to the microimages in the captured flat to generate the n images. One or more image processing techniques may be applied to two or more of these n images to produce a combined image that incorporates in-focus regions of the two or more regions.

In some embodiments of a focused plenoptic camera that employs different optical elements to provide n different focal lengths, the microimages in the flat may be substantially circular due to the circular apertures of the camera. FIG. 40 graphically illustrates a portion of a flat including circular microimages that may be captured using a microlens array similar to the example microlens array shown in FIG. 39. Note that different ones of the microimages are captured at different focal lengths (fa, fb, fc, and fd) according to the respective optical element in the array of optical elements.

In some embodiments of a focused plenoptic camera that includes different optical elements that provide n different focal lengths, the microimages in the flat may be substantially rectangular or square due to a rectangular or square aperture of the camera. In some embodiments, the focused plenoptic camera may include an aperture at the main lens. In some embodiments, a rectangular or square aperture may be used. Using a rectangular or square aperture may allow the array of microimages projected onto the photosensor by the array of optical elements to substantially fill the sensor space without empty black areas or gaps between the microimages. FIG. 41 graphically illustrates a portion of a flat including rectangular microimages that may be captured using a microlens array similar to the example microlens array shown in FIG. 39. Note that different ones of the microimages are captured at different focal lengths (fa, fb, fc, and fd) according to the respective optical element in the array of optical elements.

Example Focused Plenoptic Camera Implementation

Figure 42:
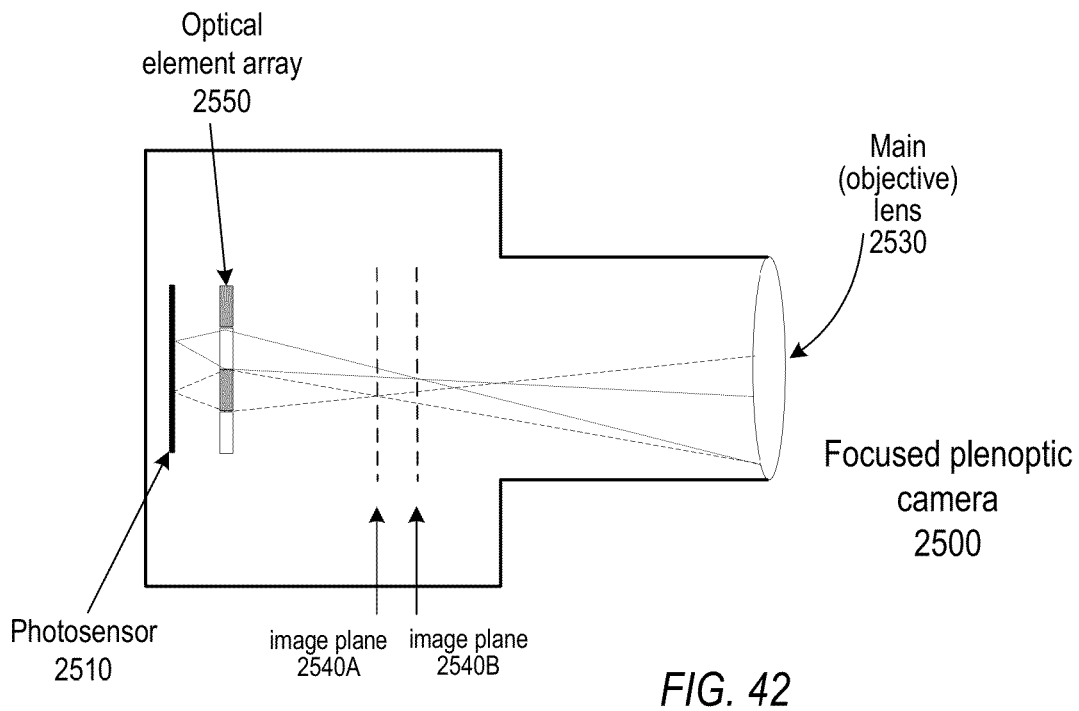
FIG. 42 is a block diagram illustrating a focused plenoptic camera, for example as illustrated in FIG. 6, including an array of optical elements that provides two or more different focal lengths, according to some embodiments.

FIG. 42 is a block diagram illustrating a focused plenoptic camera, for example as illustrated in FIG. 6, including an array of optical elements that provides two or more different focal lengths, according to some embodiments. Focused plenoptic camera 2500 may include a main (objective) lens 2530, an optical element array 2550, and a photosensor 2510. Different ones of the optical elements in array 2550 are focused on different image planes 2540A and 2540B of the main lens 2230. In some embodiments, photosensor 2510 may be conventional film; in other embodiments, photosensor 2510 may be a device for digitally capturing light, for example a CCD.

Focused plenoptic camera 2500 includes an optical element array 2550 proximate to the microlens array 2520. Optical element array 2550 includes a plurality of optical elements such as single microlenses or stacks of two or more microlenses as described herein. In FIG. 42, optical element array 2250 is shown as positioned some distance from photosensor 2510. However, in some embodiments, optical element array 2250 may be positioned directly adjacent to photosensor 2510.

In some embodiments, the camera 2500 may be configured so that an optical element array 2550 or a component thereof (for example, one microlens array in a stack of two microlenses arrays that together form the optical element array 2550) may be inserted or removed from the camera 2500 or replaced with a different optical element array 2550 or component thereof. For example, in some embodiments, an optical element array 2550 may include two different microlenses arrays as shown in FIG. 38. The second microlens array (e.g., array 2420B in FIG. 38) may be removed or swapped for a different microlens array including microlenses of different focal lengths.

Figure 43:
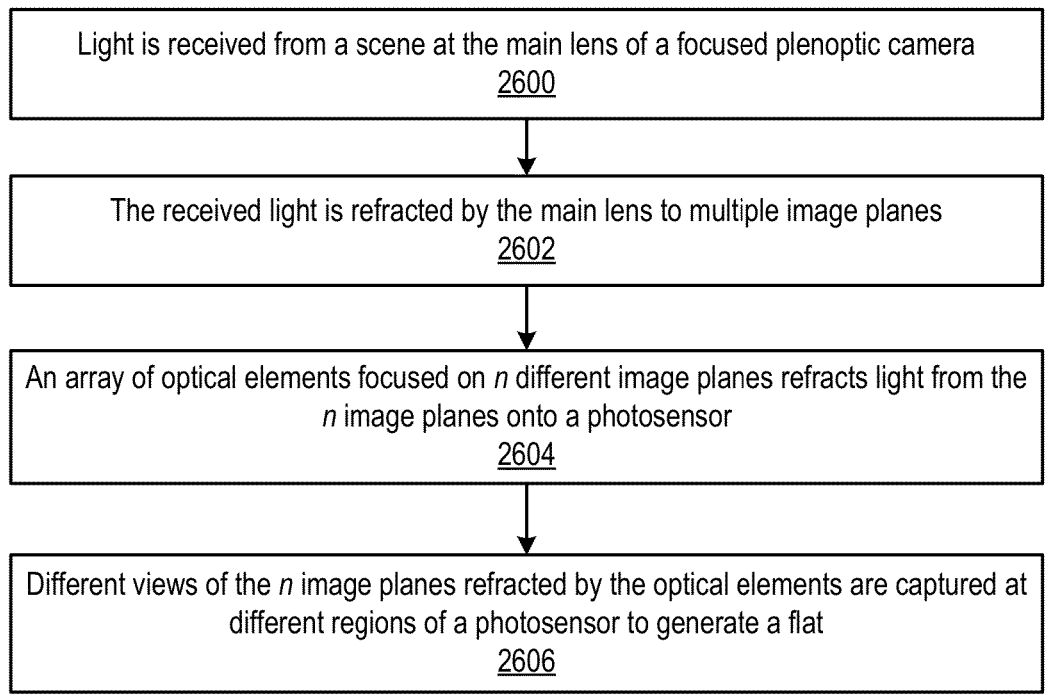
FIG. 43 is a flowchart illustrating how light is directed within a focused plenoptic camera including an array of optical elements that provides two or more different focal lengths, according to some embodiments.

FIG. 43 is a flowchart illustrating how light is directed within a focused plenoptic camera including an array of optical elements that provides two or more different focal lengths, such as camera 2500 illustrated in FIG. 42, according to some embodiments. As indicated at 2600, light from a scene is received at the main lens of a focused plenoptic camera. FIGS. 28, 31, 38 and 42 illustrate examples of focused plenoptic cameras each including an array of optical elements that provides two or more different focal lengths. As indicated at 2602, the received light is refracted by the main lens to multiple image planes. As indicated at 2604, an array of optical elements focused on n different ones of the image planes refracts light from the image plane (n is an integer greater than or equal to 2). As indicated at 2606, different views of the n different image planes, refracted by the optical elements, are captured at different regions of the photosensor to generate a flat; the flat includes one microimage for each optical element in the optical element array.

Figure 44:
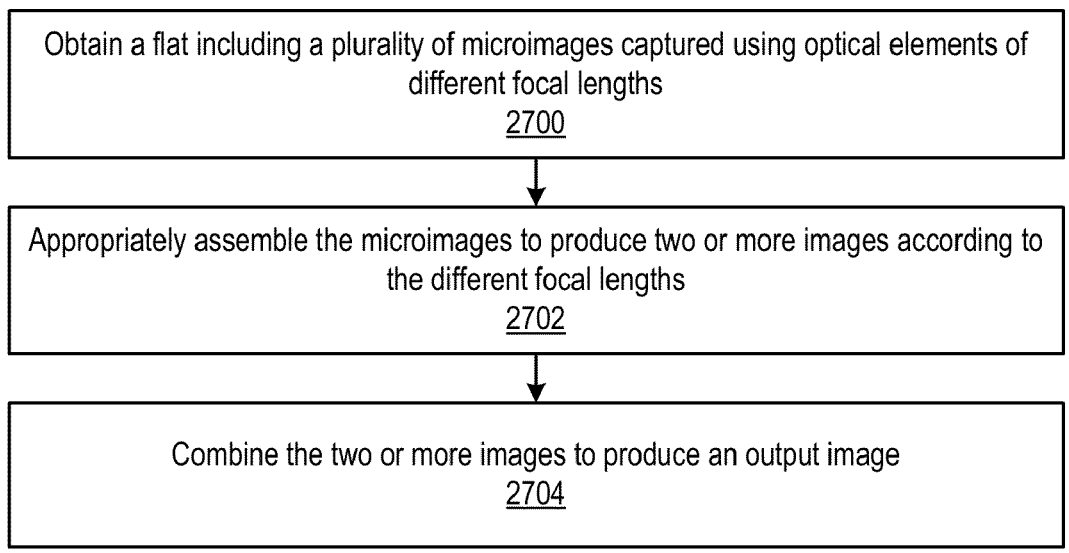
FIG. 44 is a flowchart illustrating a method in which microimages captured at different focal lengths are first combined to produce two or more separate images, according to some embodiments.
Figure 45:
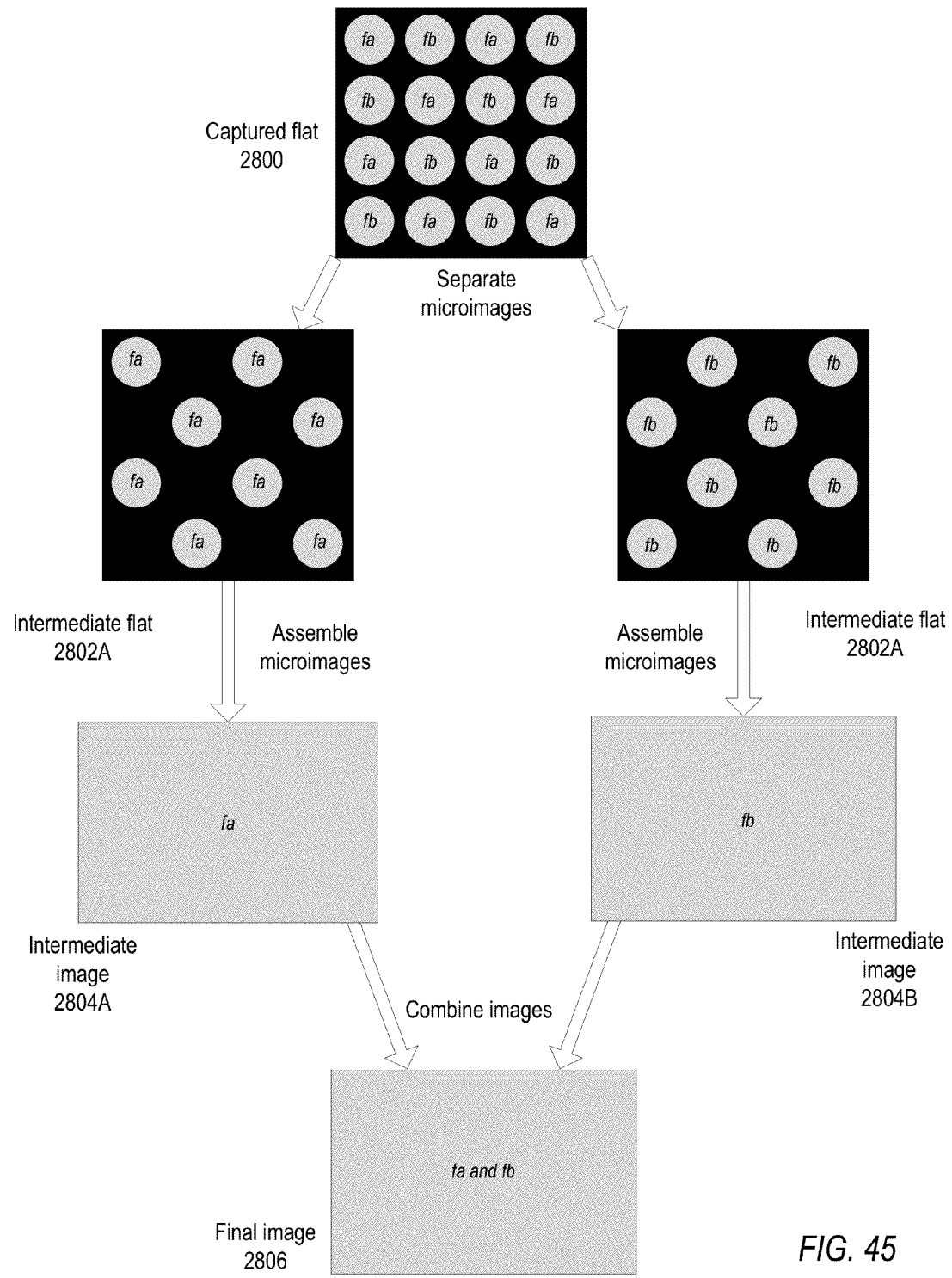
FIG. 45 graphically illustrates a method in which microimages captured at different focal lengths are first combined to produce two or more separate images, according to some embodiments.

Rendering Methods for Flats Including Microimages Captured at Different Focal Lengths FIGS. 44 and 45 illustrate a general method for rendering flats captured with a focused plenoptic camera including an array of optical elements that provides two or more different focal lengths as described above. FIG. 44 is a flowchart illustrating a method in which microimages captured at different focal lengths are first combined to produce two or more separate images, according to some embodiments. The separate images may then be combined to produce one or more output images. As indicated at 2700, a flat captured by a focused plenoptic camera including array of optical elements that provides two or more different focal lengths may be obtained. As indicated at 2702, the microimages from the flat may be appropriately assembled to produce two or more images (each "captured" at a different focal length) according to the different focal lengths used. Example methods for assembling microimages from a flat to generate an image or images are shown in FIGS. 22 and 25. As indicated at 2704, the two or more images may be appropriately combined to produce an output image. For example, in-focus regions from different ones of two or more images may be combined to produce an image in which objects within the scene are in focus at various depths.

FIG. 45 graphically illustrates a method in which microimages captured at different focal lengths are first combined to produce two or more separate images, according to some embodiments. The separate images may be combined to produce one or more output images. FIG. 45 shows a flat 2700 captured by a focused plenoptic camera that includes an array of optical elements of different focal lengths. The circles in captured flat 2700 labeled fa represent microimages captured using optical elements of focal length fa, and the circles in flat 2700 labeled fb represent microimages captured using optical elements of focal length fb. In some embodiments, the microimages from the flat 2700 may be separated to generate separate intermediate flats 2702, with each intermediate flat 2702 including microimages captured at one focal length. The microimages from each intermediate flat 2702 may be appropriately assembled to produce intermediate images 2704 at the corresponding focal lengths. Alternatively, the method may work directly from captured flat 2700 to assemble intermediate images 2704 without generating intermediate flats by appropriately selecting the microimages for each focal length from the captured flat and assembling the selected microimages. Example methods for assembling microimages to generate an image or images are shown in FIGS. 22 and 25. In some embodiments, assembling the microimages from a flat 2702 may include cropping the microimages and then moving the cropped regions together. Intermediate images 2704 may be appropriately combined to produce a final image 2706. For example, in-focus regions from different ones of two or more images may be combined to produce an image in which objects within the scene are in focus at various depths.

While FIG. 45 shows substantially circular microimages in captured flat 2800, in some embodiments, the flat 2800 may instead include substantially square or rectangular microimages, as shown in FIG. 41. The methods described in FIGS. 44 and 45 may also be applied to flats including substantially square or rectangular microimages.

In some embodiments, as an alternative to the above methods, the microimages captured at different focal lengths may first be combined to produce a combined flat and then assembled to produce one or more output images. In this method, a flat that includes microimages captured at different focal lengths may be obtained. The captured microimages may be combined to create a combined flat. The combined microimages from the combined flat may be appropriately assembled to produce an output image or images. Example methods for assembling microimages from a flat to generate an image or images are shown in FIGS. 22 and 25.

Alternative Optical Element Array Configurations

Figure 46:
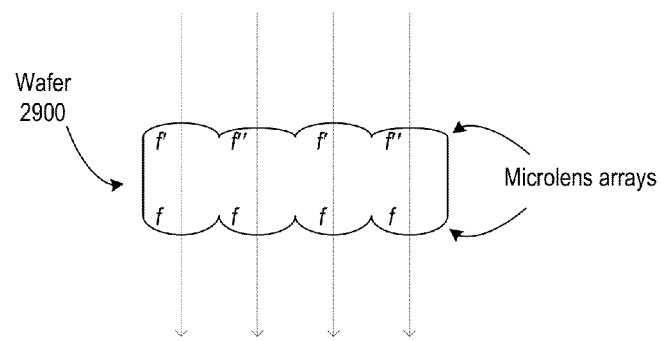
FIG. 46 illustrates an example optical element array that includes microlens arrays on both sides of a wafer, according to some embodiments.
Figure 47A:
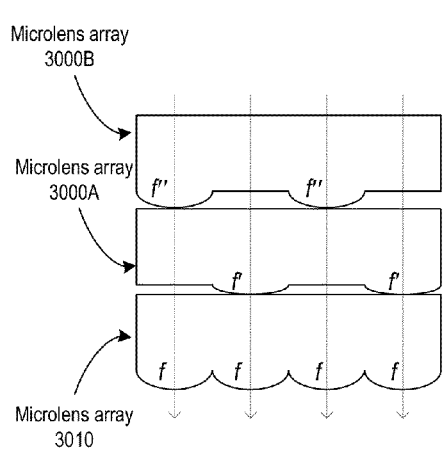
FIGS. 47A and 47B illustrate an example optical element array that includes three stacked microlens arrays according to some embodiments.
Figure 47B:
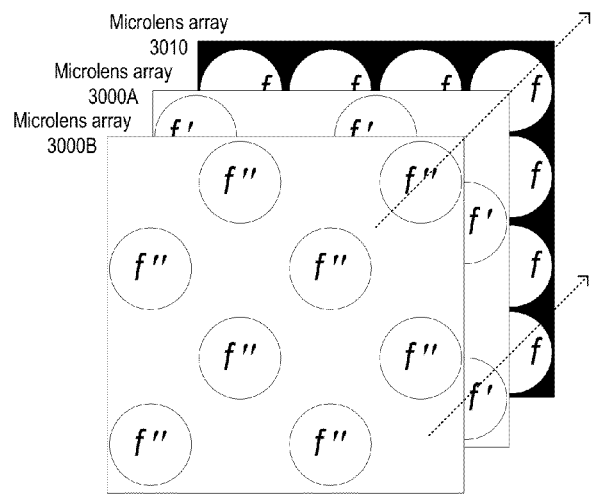

FIGS. 29, 30, 33, 34A-34B, and 37-39 illustrate various configurations of microlens arrays and optical element arrays that may be used in various embodiments. Other configurations of microlens arrays and optical element arrays are possible. FIGS. 46 and 47A-47B illustrate two such configurations that may be used. However, note that other configurations are possible.

FIG. 46 illustrates an example optical element array that is manufactured, for example as a silica wafer, with microlens arrays on both sides of the wafer 2900, according to some embodiments. Microlenses on opposite sides of the wafer are aligned on their optical axes. The microlenses on one side of the wafer are all of the same focal length f. The microlenses on the other side of the wafer are manufactured in a pattern of alternating focal lengths f' and f". Note that microlenses of more than two different focal lengths may be included on this other side of the wafer. Referring to FIG. 38, this single wafer 2900 may be substituted for the two wafers that implement first microlens array 2420A and second microlens array 2420B.

FIGS. 47A and 47B illustrate an example optical element array that includes three stacked microlens arrays, for example manufactured as three separate silica wafers, according to some embodiments. Microlens array 3010 is similar to first microlens array 2420A of FIG. 38; all of the microlenses of array 3010 are of the same focal length f. The other two microlens arrays 3000A and 3000B, however, are manufactured with gaps between the microlenses. The microlenses in arrays 3000A and 3000B are manufactured with a pitch (the distance between the centers of the microlenses) twice that of the pitch used in microlens array 3010. The gaps between the microlenses may either be clear glass to allow light to pass through, or alternatively may be holes through the wafer. The microlenses of array 3000A are aligned along the optical axis with some of the microlenses on array 3010, and the microlenses of array 3000B are aligned along the optical axis with the other microlenses on array 3010, as shown in FIGS. 47A and 47B. The microlenses on microlens array 3000A are of focal length f', and the microlenses on microlens array 3000B are of focal length f". The microlenses of the two arrays 3000A and 3000B provide a pattern of alternating focal lengths f' and f". The three microlens arrays in combination thus form an optical element array that provides different focal lengths at different optical elements. Referring to FIG. 38, the optical element array arrangement of FIGS. 47A and 47B may be substituted for first microlens array 2420A and second microlens array 2420B.

Variations of this configuration are possible and contemplated. For example, an optical element array similar to the one shown in FIGS. 47A and 47B may be configured in various ways to provide more than two different focal lengths. For example, at least one of microlens arrays 3000 may include microlenses of two or more different focal lengths. As another example variation, an optical element array may include more than two microlens arrays 3000 similar to those shown in FIGS. 47A and 47B. As yet another example variation, an optical element array may be formed by combining two microlens arrays similar to arrays 3000A and 3000B but not including microlens array 3010. Other variations than these examples are possible.

Example Modes and Applications

FIGS. 48A through 48D illustrate several example modes or configurations of a focused plenoptic camera employing microlenses with different focal lengths, according to various embodiments. These various modes may be directed to different applications. The various modes may be achieved by various configurations of the optical element arrays that provide different focal lengths as described above. Embodiments of a focused plenoptic camera may be configured to operate in one, two, or more of these modes. In addition, some embodiments of a focused plenoptic camera may be configured so that the camera may be modified to operate in two or more of the modes, for example by swapping out an optical element array for a different optical element array, or by swapping out a component (e.g., one wafer) of an optical element array for another component.

The shaded ellipses in FIGS. 48A through 48D represent the virtual 3D image of a real scene in front of the camera that is created inside the camera by the main camera lens. FIGS. 48A through 48D show the Keplerian telescopic mode of a focused plenoptic camera, but note that the modes shown in FIGS. 48A through 48D may be used in Galilean telescopic mode as well. The dashed vertical lines in FIGS. 48A through 48D represent different focal planes of the main camera lens within the virtual 3D image.

Figure 48A:
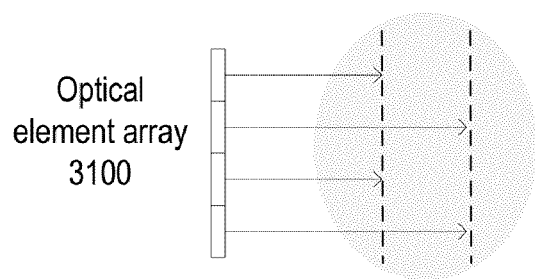
FIGS. 48A through 48D illustrate several example modes or configurations of a focused plenoptic camera employing microlenses with different focal lengths, according to various embodiments.

FIG. 48A illustrates a focused plenoptic camera mode in which two different focal lengths are implemented in an optical element array 3100 to capture microimages at two different focal planes that are spaced relatively far apart, according to some embodiments. Using this mode, for example, two images of the scene may be captured at the same time, with the foreground of the scene in focus in one of the images and the background of the scene in focus in the other image.

Figure 48B:
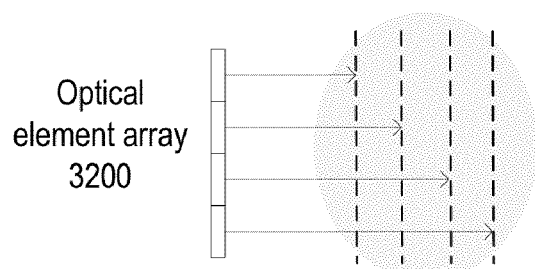

FIG. 48B illustrates a focused plenoptic camera mode in which more than two different focal lengths are implemented in an optical element array 3200 to capture microimages at more than two different focal planes that are spaced relatively far apart so that a wide range of depth is covered, according to some embodiments. In this example, four different focal lengths are used. This mode allows a sampling of different focal planes and a wide range of depth to be captured simultaneously in one flat. Table 1 illustrates an example configuration of microlenses that may be used in the mode illustrated in FIG. 48B.

Figure 48C:
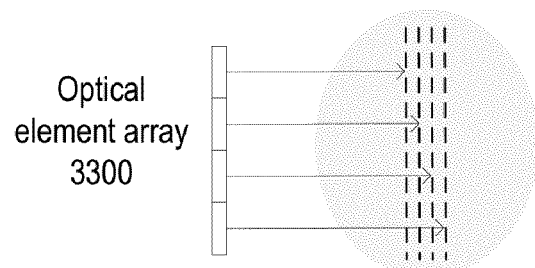

FIG. 48C illustrates a focused plenoptic camera mode in which more than two different focal lengths are implemented in an optical element array 3300 to capture microimages at more than two different focal planes that are relatively close together, according to some embodiments. The different focal planes may thus cover a relatively narrow depth of field. This mode may be useful, for example, for capturing an image of a scene in the field without worrying about precisely focusing the camera. Instead of capturing only one image of a scene, for example an action scene, which the photographer and/or camera may not have gotten into precise focus, a focused plenoptic camera in this mode captures multiple images of the scene within a single flat with slight differences in focusing. The focus may be then fine tuned later from the captured flat. Using a focused plenoptic camera in this mode, the photographer does not have to worry about precisely focusing the camera, which due to the limitations of the photographer's vision and of the scene-viewing apparatus of cameras is difficult to do and takes time. Some cameras provide autofocus capabilities; however, autofocus mechanisms often do not focus as precisely as desired, and autofocus mechanisms take time to operate. Using a focused plenoptic camera in this mode, the photographer can literally "point and shoot" a scene and fine tune the focusing of the image of the scene later using the captured flat.

Figure 48D:
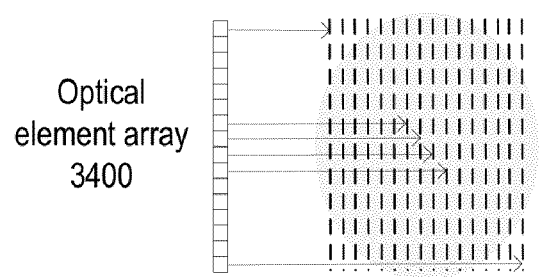

FIG. 48D illustrates a focused plenoptic camera mode in which many different focal lengths are implemented in an optical element array 3400 to capture microimages at may different focal planes that are relatively close together; the many different focal planes thus cover a wide depth of field, according to some embodiments. This mode allows virtually the entire range of 3D image created by the main camera lens to be captured in a single flat. FIG. 48D shows 16 different focal planes captured by optical elements with 16 different focal lengths. Fewer or more than 16 different focal lengths, for example 100 or more different focal lengths, may be captured in some embodiments.

Implementations of Rendering Methods

Figure 23:
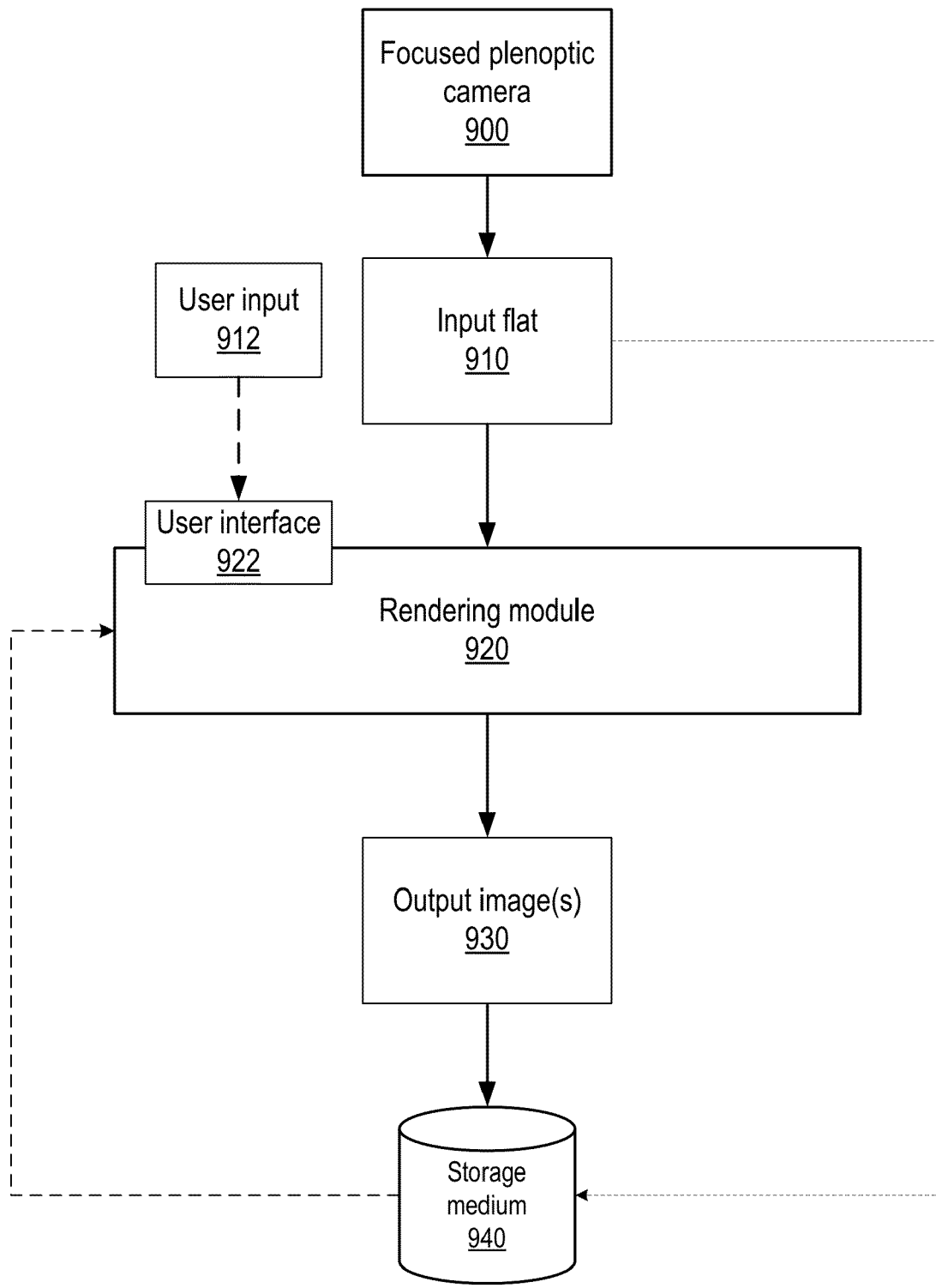
FIG. 23 illustrates a rendering module rendering a high-resolution image from a flat captured, for example, by a focused plenoptic camera, according to some embodiments.

FIG. 23 illustrates a rendering module rendering images from a flat captured, for example, by various embodiments of a focused plenoptic camera as described herein. Rendering module 920 may, for example, implement full-resolution light-field rendering methods as described in FIG. 22 and/or as described in FIG. 25. Rendering module 920 may also implement methods for rendering images from flats captured using optical elements with different focal lengths, such as the methods described in FIGS. 44 and 45. FIG. 24 illustrates an example computer system on which embodiments of rendering module 920 may be implemented. In some embodiments of a focused plenoptic camera, rendering module 920 may be implemented in the camera, e.g. in captured data processing module 260 of focused plenoptic camera 200 illustrated in FIG. 7. Referring to FIG. 23, rendering module 920 receives an input flat 910 captured by a focused plenoptic camera, such as one of the embodiments of focused plenoptic cameras described herein. Example portions of a flat as may be captured by various embodiments of a focused plenoptic camera are illustrated in FIGS. 9 and 17. Rendering module 920 then processes the input image 910 according to an appropriate rendering method or methods as described herein. Rendering module 920 generates as output one or more images 930. FIGS. 19 and 20 illustrate example high-resolution images that may be rendered and output by rendering module 920. Output image 930 may, for example, be stored to a storage medium 940, such as system memory, a disk drive, DVD, CD, etc. The dashed line from input image 910 to storage medium 940 indicates that the original (input) flat 910 may also be stored. The dashed line from storage medium 940 to rendering module 920 indicates that stored images may be retrieved and further processed by rendering module 920.

In some embodiments, rendering module 920 may provide a user interface 922 via which a user may interact with the module 920, for example to specify or otherwise manage input flats 910 and output images 930 as described herein. In some embodiments, examination of microimages to determine the direction of movement of edges may be performed by a user via the user interface 922. The user may mark or otherwise indicate areas that the user determines need be inverted via the user interface 922. In some embodiments, examination of the microimages to determine the direction of movement of edges may be performed automatically by rendering module 920. Some embodiments may allow either manual or automatic examination and detection, or a combination thereof, to be used. The user interface 922 may also provide tools whereby a user may specify areas of two or more rendered images that are to be combined to produce a higher-quality output image.

In one embodiment of a full-resolution light-field rendering method implemented in a rendering module 920, the time required to render an image is proportional to the number of microlenses times the number of pixels sampled under each microlens. In other words, the time required to render an image is directly proportional to the size of the output image 930.

Example System

Embodiments of a rendering module and/or of the various rendering methods as described herein may be executed on one or more computer systems, which may interact with various other devices. One such computer system is illustrated by FIG. 24. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, computer system 1000 may be a digital camera.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the various rendering methods disclosed herein may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 24, memory 1020 may include program instructions 1025, configured to implement embodiments of a rendering module as described herein, and data storage 1035, comprising various data accessible by program instructions 1025. In one embodiment, program instructions 1025 may include software elements of embodiments of a rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A camera, comprising:
a photosensor configured to capture light projected onto the photosensor;
an objective lens, wherein the objective lens is configured to refract light from a scene located in front of the camera to form an image of the scene at a plurality of different focal planes of the objective lens;
an optical element array positioned between the objective lens and the photosensor, wherein the optical element array comprises a plurality of optical elements, wherein the plurality of optical element are focused on the focal planes and not on the objective lens, and wherein at least two of the optical elements are of different focal lengths and are thus focused at different ones of the plurality of focal planes; and
wherein each optical element of the optical element array is configured to project a separate portion of the image of the scene formed at the focal plane on which the optical element is focused onto a separate location on the photosensor.

2. The camera as recited in claim 1, wherein each optical element in the optical element array comprises a microlens, wherein at least two of the microlenses in different ones of the optical elements are of different focal lengths to thus focus at different ones of the plurality of focal planes.

3. The camera as recited in claim 1, wherein the optical element array is a microlens array comprising a plurality of microlenses, wherein at least two of the microlenses are of different focal lengths to thus focus at different ones of the plurality of focal planes.

4. The camera as recited in claim 1, wherein each optical element in the optical element array comprises a stack of multiple microlenses aligned on the optical axes of the microlenses, wherein at least two of the microlens stacks in different ones of the optical elements provide different focal lengths to thus focus at different ones of the plurality of focal planes.

5. The camera as recited in claim 1, wherein the optical element array comprises two microlens arrays each comprising a plurality of microlenses, wherein the microlenses in the two microlens arrays are aligned on the optical axes of the microlenses, and wherein at least two of the microlenses in at least one of the two microlens arrays are of different focal lengths to thus focus at different ones of the plurality of focal planes.

6. The camera as recited in claim 5, wherein a first microlens array of the two microlens arrays is positioned proximate to the photosensor, and wherein a second microlens array is positioned proximate to the first microlens array between the first microlens array and the objective lens.

7. The camera as recited in claim 5, wherein the microlenses in the first microlens array are all of the same focal length, and wherein at least two of the microlenses in the second microlens array are of different focal lengths to thus focus at the different ones of the plurality of focal planes.

8. The camera as recited in claim 7, wherein the microlenses in the first microlens array are positioned at a distance b from the photosensor, where b is equal to the focal length of the microlenses in the first microlens array.

9. The camera as recited in claim 1, wherein the photosensor is configured to capture a flat comprising the separate portions of the image of the scene projected onto the photosensor by the optical elements, wherein each of the separate portions is in a separate region of the flat, and wherein at least two of the separate portions are captured from different ones of the plurality of focal planes according to the different focal lengths of the optical elements that project the at least two separate portions onto the photosensor.

10. The camera as recited in claim 9, wherein the camera is configured to store the captured flat to a memory device.

11. The camera as recited in claim 1, wherein the camera is configured so that the plurality of focal planes are positioned between the objective lens and the optical element array.

12. The camera as recited in claim 1, wherein the camera is configured so that the plurality of focal planes are positioned behind the photosensor.

13. A method, comprising:
receiving light from a scene at an objective lens of a camera;
refracting light from the objective lens to form an image of the scene at a plurality of different focal planes of the objective lens;
receiving light from the plurality of different focal planes at an optical element array positioned between the objective lens and a photosensor of the camera, wherein the optical element array comprises a plurality of optical elements, wherein the plurality of optical element are focused on the focal planes and not on the objective lens, and wherein at least two of the optical elements are of different focal lengths and are thus focused at different ones of the plurality of focal planes;

receiving light from the optical element array at the photosensor, wherein the photosensor receives a separate portion of the image of the scene formed at one of the plurality of focal planes from each optical element of the optical element array at a separate location on the photosensor, and wherein at least one subset of the separate portions differs from at least one other subset of the separate portions according to the different focal lengths of the optical elements in the optical element array corresponding to the microlenses that project the at least one subset of the separate portions onto the photosensor.

14. The method as recited in claim 13, wherein the optical element array is a microlens array comprising a plurality of microlenses, wherein at least two of the microlenses are of different focal lengths to thus focus at different ones of the plurality of focal planes.

15. The method as recited in claim 13, wherein the optical element array comprises two microlens arrays each comprising a plurality of microlenses, wherein the microlenses in the two microlens arrays are aligned on the optical axes of the microlenses, and wherein at least two of the microlenses in at least one of the two microlens arrays are of different focal lengths to thus focus at different ones of the plurality of focal planes.

16. The method as recited in claim 15, wherein a first microlens array of the two microlens arrays is positioned proximate to the photosensor, wherein a second microlens array is positioned proximate to the first microlens array between the first microlens array and the objective lens, wherein the microlenses in the first microlens array are all of the same focal length, wherein at least two of the microlenses in the second microlens array are of different focal lengths to thus focus at the different ones of the plurality of focal planes, and wherein the microlenses in the first microlens array are positioned at a distance b from the photosensor, where b is equal to the focal length of the microlenses in the first microlens array.

17. The method as recited in claim 13, further comprising capturing a flat comprising the separate portions of the image of the scene projected onto the photosensor by the microlenses, wherein each of the separate portions is in a separate region of the flat.

18. The method as recited in claim 17, further comprising:
appropriately combining the different separate portions from the subsets of the separate portions to generate a combined flat, wherein the combined flat comprises the combined separate portions of the image of the scene; and
appropriately assembling the plurality of combined separate portions to produce one or more images of the scene.

19. The method as recited in claim 17, further comprising:
appropriately assembling the separate portions from each of the subsets of the separate portions to generate two or more separate images of the scene each corresponding to a particular subset of the separate portions; and
appropriately combining at least two of the two or more separate images of the scene to produce a combined image of the scene.

* * * * *